US009376163B2

(12) United States Patent
Arimune et al.

(10) Patent No.: US 9,376,163 B2
(45) Date of Patent: Jun. 28, 2016

(54) DRIVING UNIT AND BATTERY-ASSISTED BICYCLE

(71) Applicant: YAMAHA HATSUDOKI KABUSHIKI KAISHA, Iwata-shi, Shizuoka (JP)

(72) Inventors: Nobuyasu Arimune, Shizuoka (JP); Satoshi Kamiya, Shizuoka (JP); Masanori Negoro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 78 days.

(21) Appl. No.: 14/107,009

(22) Filed: Dec. 16, 2013

(65) Prior Publication Data
US 2014/0166385 A1 Jun. 19, 2014

(30) Foreign Application Priority Data

Dec. 17, 2012 (JP) .................................. 2012-275142

(51) Int. Cl.
B62M 6/50 (2010.01)
B62M 6/45 (2010.01)
B62M 23/02 (2010.01)
B62M 6/55 (2010.01)

(52) U.S. Cl.
CPC . B62M 6/50 (2013.01); B62M 6/45 (2013.01); B62M 6/55 (2013.01); B62M 23/02 (2013.01)

(58) Field of Classification Search
CPC ............ B62M 6/40; B62M 6/45; B62M 6/50; B62M 23/02; B60L 11/00; B60L 15/20; B60L 15/2045
See application file for complete search history.

(56) References Cited

U.S. PATENT DOCUMENTS

| 5,370,200 A * | 12/1994 | Takata .................. B60L 3/0092 180/206.4 |
| 5,375,676 A * | 12/1994 | Takata ..................... B62M 6/55 180/206.2 |
| 5,806,621 A * | 9/1998 | Soda ................... B60L 11/1801 180/206.2 |
| 5,836,414 A * | 11/1998 | Seto ........................ B62M 6/70 180/206.1 |
| 5,857,537 A * | 1/1999 | Matsumoto .............. B62M 6/60 180/206.2 |
| 6,163,148 A * | 12/2000 | Takada ..................... B62M 6/45 180/206.3 |
| 2005/0246152 A1* | 11/2005 | Kokatsu .................. B62M 6/45 703/22 |

(Continued)

FOREIGN PATENT DOCUMENTS

CN 1151959 A 6/1997
CN 102730145 A 10/2012

(Continued)

OTHER PUBLICATIONS

Official Communication issued in corresponding European Patent Application No. 13197313.3, mailed on Mar. 31, 2014.

(Continued)

Primary Examiner — Joseph Rocca
Assistant Examiner — Daniel Yeagley
(74) Attorney, Agent, or Firm — Keating and Bennett, LLP

(57) ABSTRACT

A battery-assisted bicycle includes a driving unit that increases an assist ratio and provides a smooth assist control that does not make a rider feel uncomfortable. The driving unit includes a crankshaft to which pedals are to be connected, a crank rotation detector that detects rotation of the crankshaft, and an assist control stopping unit programmed to stop an assist control in response to the rotation of the crankshaft detected by the crank rotation detector.

14 Claims, 13 Drawing Sheets

(56) References Cited

U.S. PATENT DOCUMENTS

| | | | |
|---|---|---|---|
| 2012/0150377 A1* | 6/2012 | Buchheim | B62M 6/50 701/22 |
| 2012/0247853 A1 | 10/2012 | Hashimoto et al. | |
| 2013/0054067 A1* | 2/2013 | Shoge | B62M 6/45 701/22 |

FOREIGN PATENT DOCUMENTS

| | | |
|---|---|---|
| EP | 0 765 804 A2 | 4/1997 |
| EP | 0 976 649 A2 | 2/2000 |
| EP | 2 617 636 A1 | 7/2013 |
| JP | 07232686 A * | 9/1995 |
| JP | 08034383 A * | 2/1996 |
| JP | 2001-063678 A | 3/2001 |
| JP | 2001-239980 A | 9/2001 |
| JP | 2005132275 A * | 5/2005 |
| JP | 4129084 B2 | 7/2008 |
| JP | EP 1967446 A1 * | 9/2008 ............... B62M 6/45 |
| WO | 2012/035682 A1 | 3/2012 |

OTHER PUBLICATIONS

Partial Translation of Official Communication issued in corresponding Chinese Patent Application No. 201310693858.6, mailed on Oct. 10, 2015.

\* cited by examiner

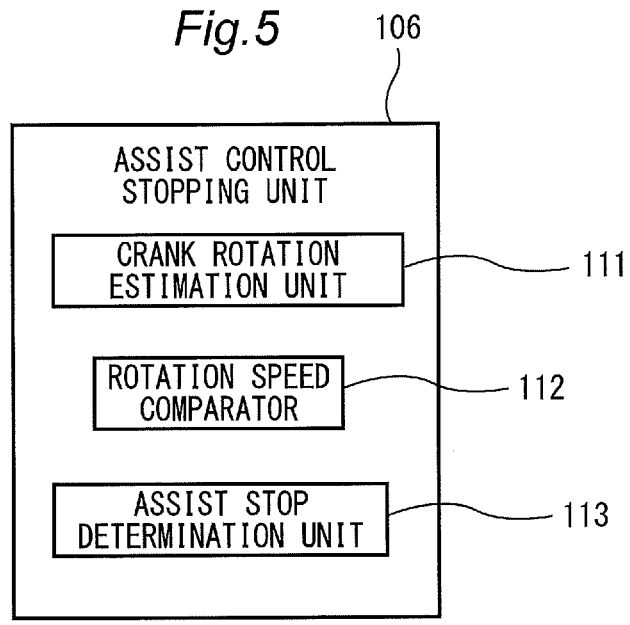
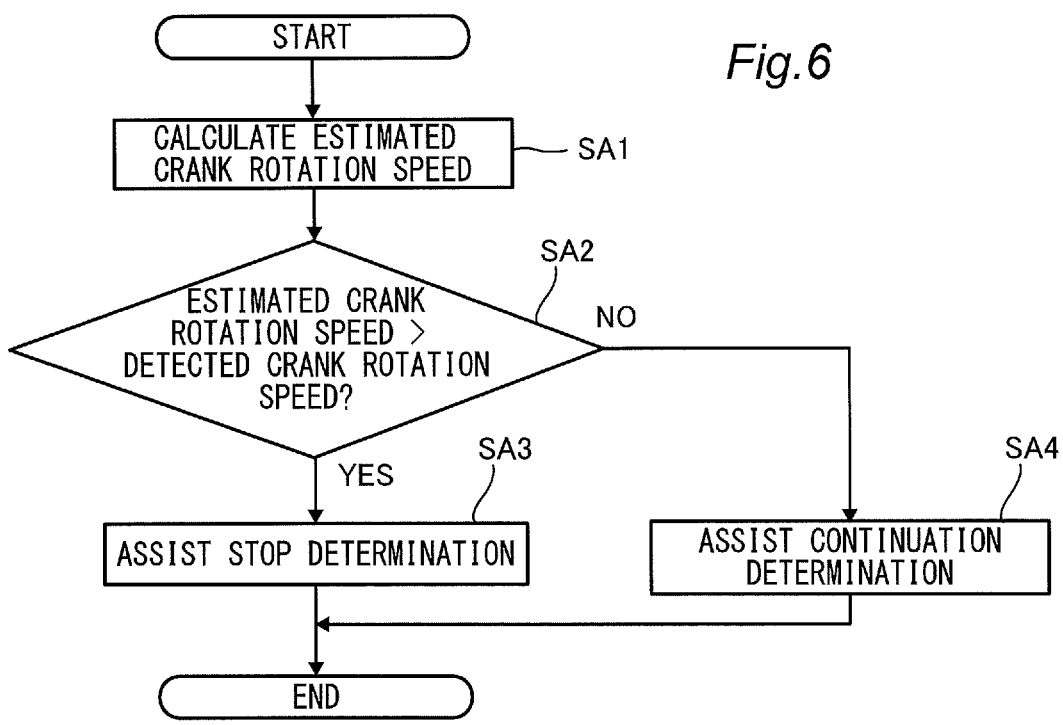

DRIVING UNIT AND BATTERY-ASSISTED BICYCLE

BACKGROUND OF THE INVENTION

1. Field of the Invention

The present invention relates to a driving unit and a battery-assisted bicycle that assists a rider's pedaling effort with a driving force from an electric motor.

2. Description of the Related Art

There has been a known battery-assisted bicycle that detects a torque generated at a crankshaft rotated together with pedals by a torque detector and controls an electric motor based on a detection result in order to assist the rider's pedaling effort. Such a battery-assisted bicycle switches between on and off of assist control in response to a torque generated at the crankshaft when a rider pushes on the pedals, for example, as disclosed in Japanese Patent No. 4129084.

More specifically, according to the disclosure in Japanese Patent No. 4129084, if a torque generated at the crankshaft is not less than an assist restarting determination value in an assist stopped state, assist control is started. On the other hand, according to the disclosure in Japanese Patent No. 4129084, assist control is stopped if a torque continues to be not more than an assist cut determination value in an assisted state at least for a determination duration.

In recent years, battery-assisted bicycles adapted to assist a rider's pedaling effort in a higher assist ratio have been requested. In such a battery-assisted bicycle, auxiliary motive power by an electric motor is larger than the rider's pedaling effort. More specifically, as the assist ratio increases, the pedaling effort by the rider decreases.

Therefore, if starting/stopping of assist control is determined using a torque generated at the crankshaft as disclosed in Japanese Patent No. 4129084, a battery-assisted bicycle with a high assist ratio ends up repeatedly starting and stopping assist control in response to slight changes of a small torque value.

More specifically, in the structure disclosed above, the assist control starts or stops in response to a slight change in the torque value, and the rider may feel uncomfortable.

SUMMARY OF THE INVENTION

A preferred embodiment of the present invention provides a driving unit and a battery-assisted bicycle that achieves both an increased assist ratio and smooth assist control that does not make a rider feel uncomfortable.

A driving unit according to a preferred embodiment of the present invention assists a rider's pedaling effort by providing a driving force from an electric motor. The driving unit includes a crankshaft to which pedals are to be connected, a crank rotation detector that detects rotation of the crankshaft, and an assist control stopping unit that stops assist control in response to the rotation of the crankshaft detected by the crank rotation detector.

The driving unit according to a preferred embodiment of the present invention can stop assist control accurately in response to rotation of the crankshaft. In this manner, if an assist ratio is increased, smooth assist control is carried out without making a rider feel uncomfortable.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a block diagram of a general structure of an assist control stopping unit in the battery-assisted bicycle according to the first preferred embodiment of the present invention.

FIG. 6 is a flowchart for illustrating assist stop determination in the battery-assisted bicycle according to the first preferred embodiment of the present invention.

DETAILED DESCRIPTION OF THE PREFERRED EMBODIMENTS

Now, preferred embodiments of the present invention will be described in conjunction with the accompanying drawings, in which the components shown are not drawn to scale.

In the following description, the front, back, left, and right refer to these directions as viewed from a rider seated on a seat 24 of a battery-assisted bicycle 1 and holding a handle 23.

First Preferred Embodiment

Figure 1:
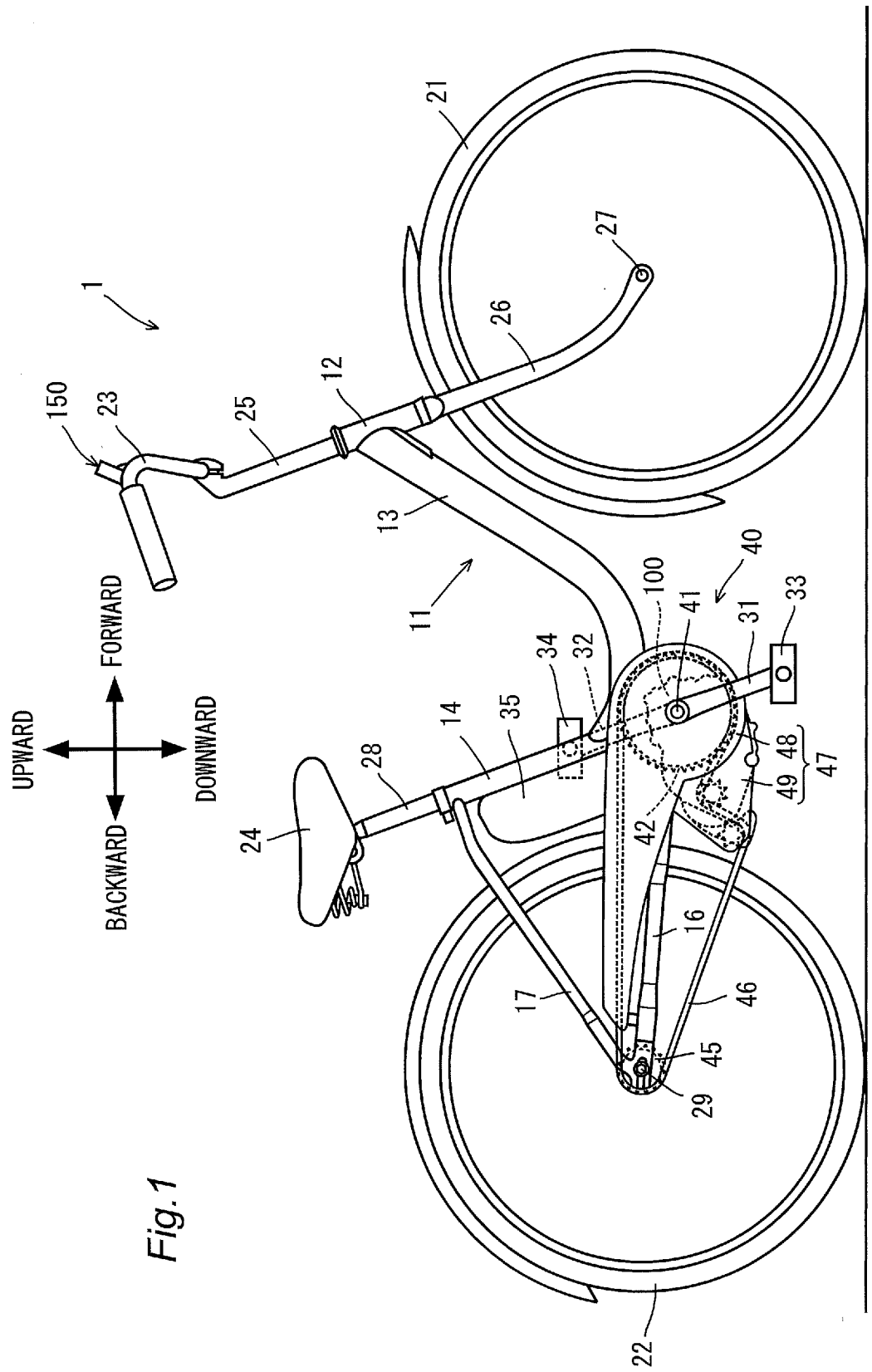
FIG. 1 is a right side view of a general structure of a battery-assisted bicycle according to a first preferred embodiment of the present invention.
Figure 2:
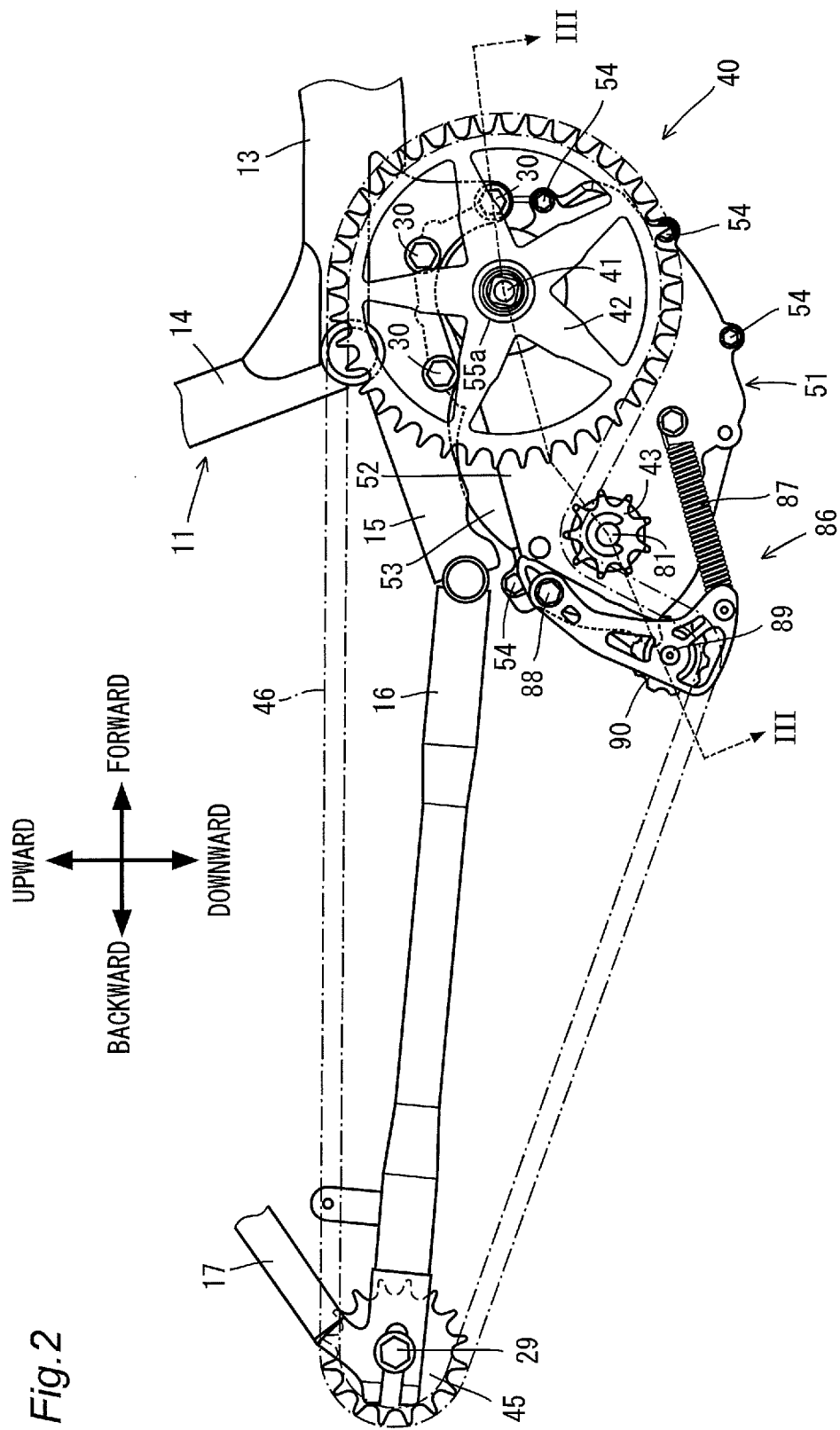
FIG. 2 is a view of a general structure of a driving unit and a driven sprocket in the battery-assisted bicycle according to the first preferred embodiment of the present invention.

FIG. 1 shows a general structure of a battery-assisted bicycle 1 according to a first preferred embodiment of the present invention. FIG. 2 shows a general structure of a driving unit 40 and a driven sprocket 45 of the battery-assisted bicycle 1. As will be described, in this battery-assisted bicycle 1, a pedaling effort generated by a rider pushing on pedals 33 and 34 (see FIG. 1) is assisted by providing a driving force output by an electric motor 61 (see FIG. 3). More specifically, the battery-assisted bicycle 1 includes a driving mechanism that assists the pedaling effort in addition to a general structure as a bicycle.

As shown in FIG. 1, the battery-assisted bicycle 1 includes a vehicle body frame 11 that extends in a front-back direction. The battery-assisted bicycle 1 includes a front wheel 21, a rear wheel 22, the handle 23, the seat 24, and the driving unit 40.

The vehicle body frame 11 includes a head pipe 12, a down frame 13, a seat frame 14, a bracket 15 (see FIG. 2), a pair of chain stays 16, and a pair of seat stays 17. As shown in FIG. 1, the head pipe 12 is provided at a front portion of the battery-assisted bicycle 1. The head pipe 12 is connected with a front side of the down frame 13 that extends rearward. The seat frame 14 is connected to a rear side of the down frame 13 and extends upward and obliquely rearward from a rear end of the down frame 13.

As shown in FIG. 2, the bracket 15 is attached to the rear side of the down frame 13. The pair of chain stays 16 is connected to a rear side of the bracket 15 as the stays hold the rear wheel 22 between them in a left-right direction. As shown in FIG. 1, the seat stays 17 each have one end connected to one of the chain stays 16. The seat stays 17 have their other ends connected to the seat frame 14.

The head pipe 12 includes a handle stem 25 rotatably inserted therein. The handle 23 is fixed at an upper end of the handle stem 25. A front fork 26 is fixed to a lower end of the handle stem 25. The front wheel 21 is supported rotatably by an axle 27 at a lower end of the front fork 26.

A seat pipe 28 is inserted inside the cylindrical seat frame 14. The seat 24 is provided at an upper end of the seat pipe 28.

As shown in FIGS. 1 and 2, the rear wheel 22 is rotatably supported by an axle 29 at rear ends of the pair of chain stays 16. The driven sprocket 45 is provided coaxially with the axle 29 on the right side of the rear wheel 22. The driven sprocket 45 is coupled to the rear wheel 22 through a one-way clutch 92 (see FIG. 4).

As shown in FIG. 2, the driving unit 40 is fixed to the bracket 15 by a plurality of metal fasters 30. The structure of the driving unit 40 will be described. As shown in FIGS. 1 and 2, an endless chain 46 is wound around a driving sprocket 42 (that will be described) of the driving unit 40 and the driven sprocket 45 provided at the rear wheel 22. A chain cover 47 is attached to the vehicle body frame 11 to cover the driving unit 40 and the chain 46 (see FIG. 1). The chain cover 47 includes a main cover 48 and a sub cover 49. The main cover 48 covers a right portion of the driving sprocket 42 and extends in the front-back direction. The sub cover 49 covers a rear right portion of the driving unit 40.

As shown in FIG. 1, crank arms 31 and 32 are attached to both ends of the crankshaft 41 of the driving unit 40 that will be described. The crank arms 31 and 32 are attached with pedals 33 and 34, respectively, at their tip ends.

As shown in FIG. 1, a battery unit 35 used to supply electric power to the electric motor 61 of the driving unit 40 that will be described is provided behind the seat frame 14. The battery unit 35 includes a battery and a battery controller that are not shown. The battery is a chargeable/dischargeable battery. The battery controller controls charge/discharge to/from the battery and also monitors the output current and remaining capacity of the battery.

Figure 3:
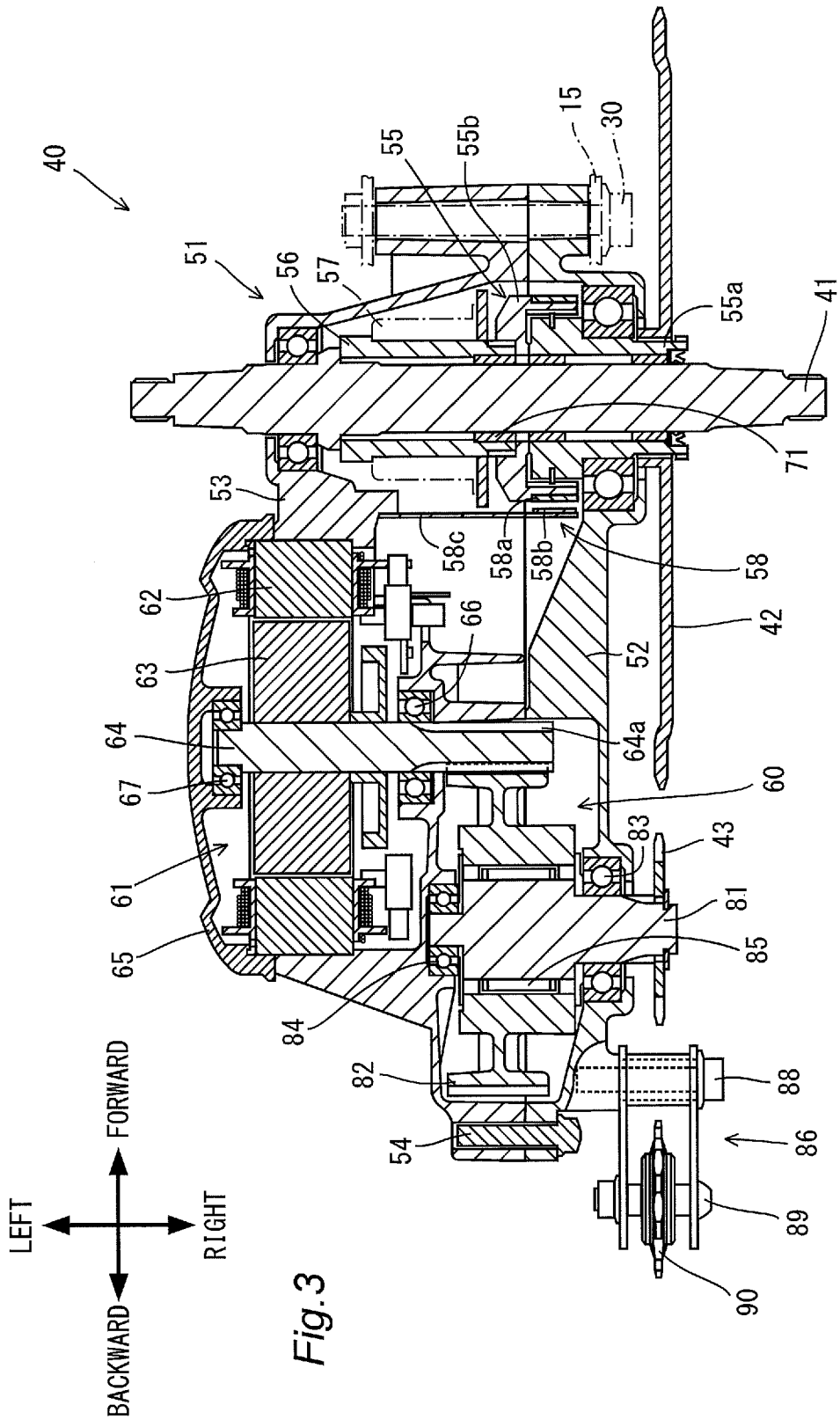
FIG. 3 is a sectional view taken along line III-III in FIG. 2.

FIG. 3 is a sectional view of a general structure of the driving unit 40. FIG. 3 is a sectional view taken along line III-III in FIG. 2.

Figure 4:
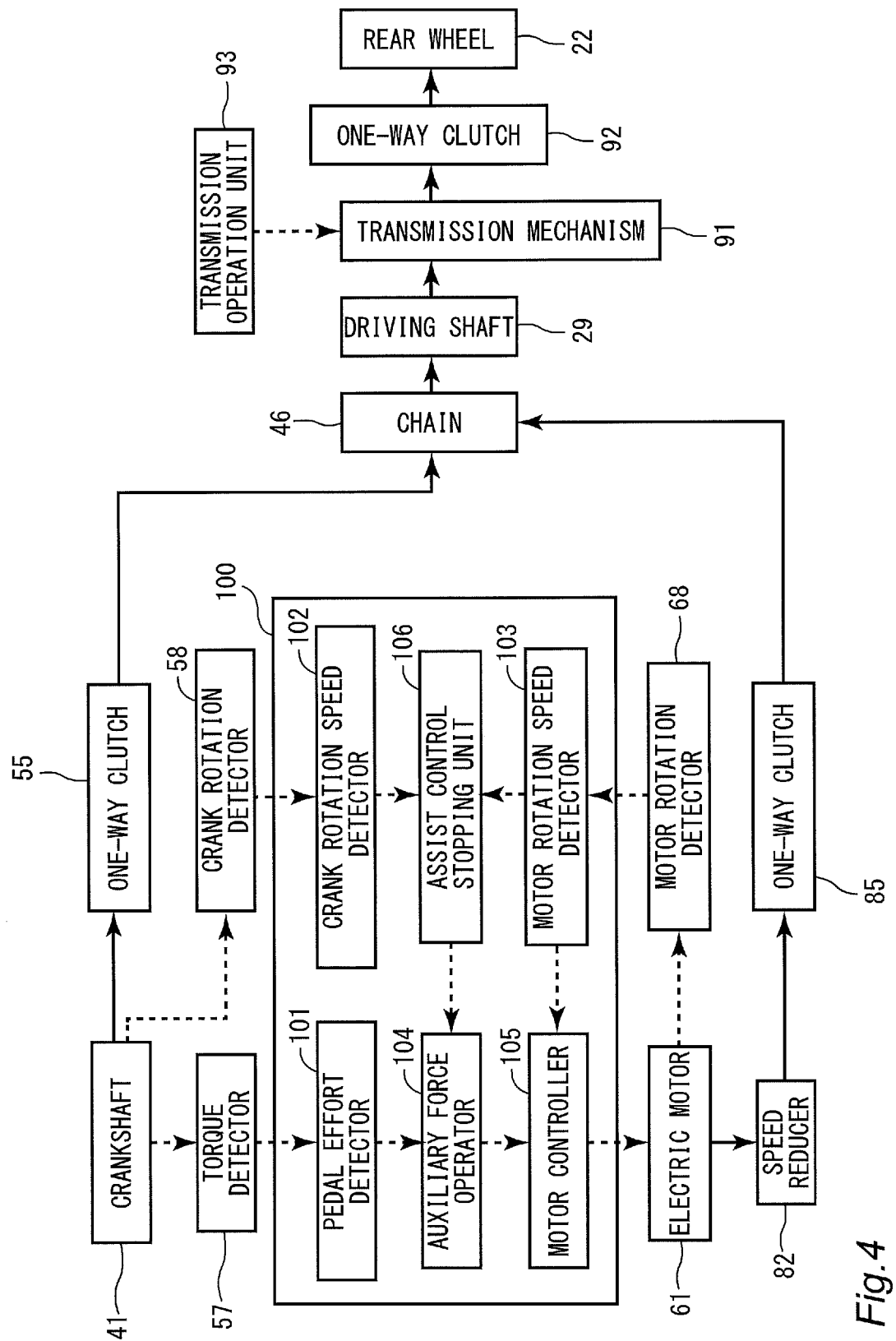
FIG. 4 is a schematic block diagram of motive power transmission and signal transmission paths in the battery-assisted bicycle according to the first preferred embodiment of the present invention.

As shown in FIG. 3, the driving unit 40 includes a main body 51, the crankshaft 41, the driving sprocket 42, a driving force generator 60, an auxiliary sprocket 43, a chain tensioner 86, and a controller 100 (see FIGS. 1 and 4).

The main body 51 includes a first case portion 52 and a second case portion 53 assembled with each other in the left-right direction. The first and second case portions 52 and 53 are fixed to each other by a plurality of metal fasteners 54 (see FIGS. 2 and 3). The main body 51 is attached to the bracket 15 by the above-described metal fasteners 30.

As shown in FIG. 3, the crankshaft 41 is provided through the main body 51 in the left-right direction and supported rotatably at a front end of the main body 51. The crankshaft 41 is supported rotatably by the first and second case portions 52 and 53 through a plurality of bearings. A substantially cylindrical inner member 55a that rotates together with the crankshaft 41 is provided on one side of the crankshaft 41. As described above, the crank arms 31 and 32 are connected to both ends of the crankshaft 41, so that the crankshaft 41 rotates as a rider pushes on the pedals 33 and 34.

The driving sprocket 42 is attached to a right end of the outer circumferential surface of the inner member 55a. The crankshaft 41, the inner member 55a, and the driving sprocket 42 are provided coaxially to one another.

A substantially cylindrical rotation member 56 is provided coaxially with the crankshaft 41 at an axially central portion of the crankshaft 41. A right end of the rotation member 56 is supported at the crankshaft 41 through a cylindrical slider bearing 71. A left end of the rotation member 56 is connected to the crankshaft 41, for example, by a spline mechanism. In this manner, the rotation member 56 rotates together with the crankshaft 41.

A torque detector 57 is provided coaxially with the rotation member 56. An example of the torque detector 57 includes a magneto-strictive torque sensor. When the torque detector 57 is a magneto-strictive type torque sensor, the torque detector 57 includes a coil opposed to an outer circumferential surface of the rotation member 56. The torque detector 57 including such a structure detects a distortion of the rotation member 56 as a voltage change across the coil in order to detect a torque at the crankshaft 41. The torque detector 57 outputs a signal based on the detected torque to the controller 100 (FIG. 4) that will be described. The controller 100 controls the electric motor 61 (that will be described) based on the signal output from the torque detector 57. Note that the torque detector 57 may have a structure other than that of the magneto-strictive torque sensor as far as the structure is capable of detecting the pedaling effort.

A one-way clutch (crank side one-way clutch) 55 includes a substantially cylindrical outer member 55b provided coaxially with the crankshaft 41 so as to couple the rotation member 56 and the inner member 55a. A left end of the outer member 55b and a right end of the rotation member 56 are connected, for example, by a spline mechanism. In this manner, the outer member 55b rotates together with the rotation member 56.

A right end of the outer member 55b and a left end of the inner member 55a are connected, for example, by a latch mechanism so that only rotation force in one direction is transmitted from the outer member 55b to the inner member 55a. In this manner, a rotation force in a forward turning direction (clockwise as viewed from the right) is transmitted from the outer member 55b to the inner member 55a. However, a rotation force in a backward turning direction (anticlockwise as viewed from the right) is not transmitted from the outer member 55b to the inner member 55a.

This structure allows a rider's pedaling effort to be transmitted from the crankshaft 41 to the inner member 55a through the rotation member 56 and the outer member 55b when the rider pushes on the pedals 33 and 34 and rotate the crankshaft 41 to propel the battery-assisted bicycle 1. Therefore, the inner member 55a and the driving sprocket 42 are turned forward. On the other hand, when the rider turns the crankshaft 41 backward, the rotation is not transmitted from the outer member 55b to the inner member 55a. Therefore, the inner member 55a and the driving sprocket 42 are not turned backward.

As shown in FIG. 3, a substantially cylindrical magnet 58a is provided on an outer circumferential surface of the outer member 55b of the one-way clutch 55. An encoder 58b including a Hall element is provided in a position opposed to a portion of the outer circumferential surface of the magnet 58a. The encoder 58b is held on an inner surface of the second case portion 53 by a resin support member 58c. The encoder 58b detects a change in the magnetic field of the magnet 58a provided on the outer circumferential surface of the outer member 55b. In this manner, rotation of the crankshaft 41 connected with the outer member 55b is detected. In other words, the magnet 58a and the encoder 58b define a crank rotation detector 58 that detects rotation of the crankshaft 41. The crankshaft rotation detector 58 outputs a pulse signal when the encoder 58b detects a change in the magnetic field of the magnet 58a.

The driving force generator 60 is provided behind the crankshaft 41 in the first and second case portions 52 and 53. The driving force generator 60 includes the electric motor 61, an output shaft 81, and a gear 82.

The electric motor 61 generates an auxiliary driving force used to assist the battery-assisted bicycle 1 in travelling based on a control signal output from the controller 100 that will be described. In addition, the electric motor 61 is controlled to change the auxiliary driving force used to assist the battery-assisted bicycle 1 in travelling in response to an assist mode.

The electric motor 61 includes a stator 62, a rotor 63, and a rotation shaft 64. The stator 62 is fixed to the second case portion 53. The second case portion 53 is attached with a motor cover 65 to cover a left side portion of the electric motor 61. The rotation shaft 64 is provided through and fixed to the rotor 63. The rotation shaft 64 is supported rotatably at the second case portion 53 and the motor cover 65 through rolling bearings 66 and 67. A gear groove 64a is provided at a right end of the rotation shaft 64.

Although not shown, the controller 100 that will be described is provided in the vicinity of the electric motor 61. According to a preferred embodiment, the controller 100 is preferably provided near the electric motor 61, but the controller may be provided at any other location.

Although not shown, the electric motor 61 is provided with a motor rotation detector 68 (see FIG. 4) used to detect rotation of the rotor 63. The motor rotation detector 68 includes an encoder to detect rotation of the rotor 63 of the electric motor 61.

As shown in FIG. 3, the output shaft 81 is supported rotatably at the main body 51 in a position behind the crankshaft 41. More specifically, the output shaft 81 is supported rotatably at the first and second case portions 52 and 53 through rolling bearings 83 and 84.

The gear 82 is provided coaxially with the output shaft 81 between the rolling bearings 83 and 84. The gear 82 engages with the gear groove 64a provided in the rotation shaft 64 of the electric motor 61. In this manner, an auxiliary driving force generated at the electric motor 61 is transmitted to the gear 82 and the gear 82 is rotated. According to the present preferred embodiment, the electric motor 61 is preferably arranged so that the rotation shaft 64 turns forward. The gear 82 therefore rotates backward due to the auxiliary driving force transmitted from the rotation shaft 64.

A one-way clutch (motor side one-way clutch) 85 is provided between the gear 82 from the rotation shaft 64 and the output shaft 81. The one way clutch 85 is arranged to transmit a rotation force in the backward turning direction but not in the forward turning direction from the gear 82 to the output shaft 81.

The auxiliary sprocket 43 is provided coaxially with the output shaft 81 at a right end of the output shaft 81. The auxiliary sprocket 43 and the output shaft 81 are connected with each other, for example, by a spline mechanism. In this manner, an auxiliary driving force generated at the driving force generator 60 is transmitted to the auxiliary sprocket 43 from the output shaft 81. In this manner, the auxiliary sprocket 43 is turned backward.

The chain tensioner 86 is provided at a rear end of a rear end of a right side surface of the first case portion 52. As shown in FIG. 2, the chain tensioner 86 includes one end side connected to the first case portion 52 through a tension spring 87. The chain tensioner 86 has its other end side connected rotatably to the first case portion 52 by a support bolt 88. A tension sprocket 90 that is rotatable to a support bolt 89 is provided on the chain tensioner 86. The chain 46 (motive power transmission member) is wound around the tension sprocket 90 so that the tension sprocket 90 is pushed backward. Therefore, the chain 46 is adjusted to have an appropriate tension by the chain tensioner 86.

The controller 100 carries out assist control for the battery-assisted bicycle 1. As shown in FIG. 4, the controller 100 includes a pedaling effort detector 101, a crank rotation speed detector 102, a motor rotation speed detector 103, an auxiliary force operator 104, a motor controller 105, and an assist control stopping unit 106. The structure of the controller 100 will be described in detail.

FIG. 4 is a block diagram showing how signals are received/transmitted and motive power is transmitted during assist control by the electric motor 61 in the battery-assisted bicycle 1. In FIG. 4, the signal transmission/reception during assist control is designated by the broken line arrow and the motive power transmission is designated by the solid line arrow. Note that among the reference characters in FIG. 4, the same reference characters as those shown in FIGS. 1 to 3 represent the same elements in the battery-assisted bicycle 1.

Assist control in the battery-assisted bicycle 1 is achieved by controlling the driving of the electric motor 61 in response to a pedaling effort by a rider using the controller 100. More specifically, the controller 100 detects the rider's pedaling effort based on a signal output from the torque detector 57 that detects a torque at the crankshaft 41. The controller 100 is programmed to control the output of the electric motor 61 in response to the detected pedaling effort. Furthermore, the controller 100 obtains a rotation speed of the crankshaft 41 based on a pulse signal output from the crank rotation detector 58 that detects rotation of the crankshaft 41 and stops the assist control in response to the rotation speed.

As described above, the controller 100 includes the pedaling effort detector 101, the crank rotation speed detector 102, the motor rotation speed detector 103, the auxiliary force operator 104, the motor controller 105, and the assist control stopping unit 106.

The pedaling effort detector 101 obtains a pedaling effort by a rider based on a torque at the crankshaft 41 detected by the torque detector 57. The crank rotation speed detector 102 detects a rotation speed of the crankshaft 41 based on rotation of the crankshaft 41 detected by the crankshaft rotation detector 58. The motor rotation speed detector 103 obtains a rotation speed of the electric motor 61 based on rotation of the electric motor 61 detected by the motor rotation detector 68.

The auxiliary force operator 104 calculates a necessary driving force (auxiliary force) from the electric motor 61 based on the pedaling effort detected by the pedaling effort detector 101. The auxiliary force operator 104 calculates a necessary driving force from the electric motor 61 so that assist control is stopped when the assist control stopping unit 106 determines to stop the assist control.

Furthermore, the auxiliary force operation unit 104 calculates a driving force of the electric motor in response to an assist mode for assist control.

Now, the assist mode for the battery-assisted bicycle 1 will be described briefly. The assist mode for the battery-assisted bicycle 1 includes, for example, four modes including "intense," "standard," "auto-echo," and "off." The driving force of the electric motor 61 decreases in the order of "intense," "standard," and "auto-echo" for the same pedaling effort.

When the assist mode is set to "standard," the electric motor 61 generates a driving force when the battery-assisted bicycle 1 starts or travels on a flat road or an upward slope. In the "intense" assist mode, the electric motor 61 generates a driving force when the battery-assisted bicycle 1 starts or travels on a flat road or an upward slope similarly to the "standard" mode. The electric motor 61 generates a greater driving force in the "intense" mode than in the "standard" mode for the same pedaling effort.

In the "auto-echo" assist mode, the electric motor 61 generates a driving force smaller than that in the "standard" mode for the same pedaling effort when the battery-assisted bicycle 1 starts or travels on an upward slope. In the "off" assist mode, the electric motor 61 does not generate a driving force.

Therefore, the assist ratio of the electric motor 61 to the rider's pedaling effort changes among the above-described assist modes. Here, the assist ratio refers to the ratio of the driving force from the electric motor 61 to the rider's pedaling effort.

Note that in the above description, the assist mode is preferably switched among the four stages. However, the assist mode can be switched among three stages or less or among five stages or more.

The motor controller 105 is programmed to control driving of the electric motor 61 so that a necessary driving force requested by the auxiliary force operation unit 104 is output by the electric motor 61. The motor controller 105 controls driving of the electric motor 61 in response to the rotation speed of the electric motor 61 detected by the motor rotation speed detector 103.

The assist control stopping unit 106 determines whether or not to stop assist control based on a rotation speed of the crankshaft 41 output from the crank rotation speed detector 102.

More specifically, the assist control stopping unit 106 determines to stop the assist control if the rotation speed of the crankshaft 41 output from the crank rotation speed detector 102 is less than the rotation speed of the crankshaft 41 estimated from the rotation speed of the electric motor 61. In this manner, if the rotation speed of the crankshaft 41 is less than the crank rotation speed estimated from the rotation speed of the electric motor 61, it is determined that a rider has stopped pushing on the pedals 33 and 34. In such a case, the assist control is stopped, so that the assistance provided by the electric motor 61 is stopped quickly. In addition, in a traveling state with a small pedaling effort or a small torque generated at the crankshaft 41, if the assist control is stopped in response to the rotation speed of the crankshaft 41 as described above, the assist control is not stopped erroneously. When the driver rotates the crankshaft 41 rearward, the rotational speed of the crankshaft 41 is a negative value. In this case, the rotational speed of the crankshaft 41 is smaller than the estimated rotational speed of the crankshaft 41 based on the rotational speed of the electric motor 61. As such, the assist control stopping unit 106 determines that assist control is to be stopped.

As shown in FIG. 5, the assist control stopping unit 106 includes a crank rotation estimation unit 111, a rotation speed comparator 112, and an assist stop determination unit 113.

The crank rotation estimation unit 111 estimates a rotation speed of the crankshaft 41 based on a rotation speed of the electric motor 61 output from the motor rotation speed detector 103. The rotation speed of the crankshaft 41 is estimated based on the rotation speed of the electric motor 61 in this manner for the following reason.

As shown in FIG. 2, in the battery-assisted bicycle 1, the driving sprocket 42 connected to the crankshaft 41 through the one-way clutch 55 and the auxiliary sprocket 43 provided at the output shaft 81 that outputs rotation of the electric motor 61 transmit a driving force to the rear wheel 22 through the chain 46. As shown in FIG. 4, the rotation of the chain 46 is transmitted to the rear wheel 22 through the axle 29 (driving shaft) of the rear wheel 22, a transmission mechanism 91, and the one-way clutch 92. The transmission mechanism 91 and the one-way clutch 92 are attached to a side of the rear wheel 22. The transmission mechanism 91 is operated by a transmission operation unit 93 (not shown) provided at the handle 23.

The gear (speed reducer) 82 and the one-way clutch (motor side one-way clutch) 85 are provided between the electric motor 61 and the output shaft 81 as described above. The one-way clutch (crank side one-way clutch) 55 is provided between the crankshaft 41 and the driving sprocket 42. The above-described structure allows rotation of the electric motor 61 and the crankshaft 41 only in one direction to be transmitted to the chain 46, and the crankshaft 41 and the output shaft 81 rotate synchronously with each other when a torque is generated at the crankshaft 41 and the output shaft 81.

In the structure described above, the rotation speed of the electric motor 61 and the rotation speed of the crankshaft 41 are different by a reduction ratio of the electric motor 61 (a reduction ratio based on a reduction ratio of the gear 82 in consideration of a diameter ratio of the driving sprocket 42 and the auxiliary sprocket 43). More specifically, the rotation speed of the crankshaft 41 is estimated using the reduction ratio of the electric motor 61 based on the rotation speed of the electric motor 61.

The rotation speed comparator 112 compares the estimated rotation speed of the crankshaft 41 obtained by the crank rotation estimation unit 111 (hereinafter also referred to as "estimated crank rotation speed") and the rotation speed of the crankshaft 41 obtained by the crank rotation speed detector 102 (hereinafter also referred to as "detected crank rotation speed"). The rotation speed comparator 112 outputs a signal to the assist stop determination unit 113 if the detected crank rotation speed is less than the estimated crank rotation speed.

The assist stop determination unit 113 determines to stop the assist control in response to the signal output from the rotation speed comparator 112. The assist stop determination unit 113 outputs a stop signal to the auxiliary force operator 104 upon determining to stop the assist control.

Now, in the battery-assisted bicycle 1 having the above-described structure, assist stop determination by the assist control stopping unit 106 will be described according to the flow shown in FIG. 6.

When the assist stop determination flow in FIG. 6 starts (START), in step SA1, the crank rotation estimation unit 111 obtains an estimated crank rotation speed based on a rotation speed of the electric motor 61 output from the motor rotation speed detector 103. In the succeeding step SA2, rotation speed comparator 112 compares the estimated crank rotation speed (threshold) obtained in step SA1 with a detected crank rotation speed output from the crank rotation speed detector 102.

If it is determined in step SA2 that the detected crank rotation speed is less than the estimated rotation speed (YES), the control proceeds to step SA3 and carries out a determination to stop the assist control by the assist stop determination unit 113 (assist stop determination). On the other hand, if it is determined that the detected crank rotation speed is not less than the estimated crank rotation speed (NO), the control proceeds to step SA4 and does not carry out an assist stop determination by the assist stop determination unit 113. More specifically, in step SA4, determination to continue the assist control (assist continuation determination) is carried out.

After the determination in steps SA3 and SA4, the flow ends (END).

In this manner, in the assist stop determination flow according to the present preferred embodiment, if the detected crank rotation speed is less than the estimated crank rotation speed, stopping of the assist control is determined. Note that a value compared to the detected crank rotation speed may be another threshold such as a fixed value instead of the estimated crank rotation speed.

According to the present preferred embodiment, the battery-assisted bicycle 1 includes the crankshaft 41 to which the pedals 33 and 34 are to be connected, the crank rotation detector 58 that detects rotation of the crankshaft 41, and the assist control stopping unit 106 that stops assist control in response to the rotation of the crankshaft 41 detected by the crank rotation detector 58.

In this manner, if the assist ratio by the electric motor 61 increases, assist control is stopped accurately in response to rotation of the crankshaft 41. Therefore, an increase in the assist ratio by the electric motor 61 and smooth assist control are achieved at the same time. In addition, under traveling conditions having a small pedaling effort, assist control is prevented from being erroneously stopped. Furthermore, when the rider stops pushing on the pedals 33 and 34, assist control is stopped quickly.

According to the present preferred embodiment, the crank rotation detector 58 is arranged to detect a rotation speed of the crankshaft 41. The assist control stopping unit 106 stops assist control in response to the rotation speed of the crankshaft 41 detected by the crank rotation detector 58. In this manner, a structure that allows assist control to be stopped in response to rotation of the crankshaft 41 is implemented.

According to the present preferred embodiment, the assist control stopping unit 106 stops assist control if a rotation speed of the crankshaft 41 is smaller than a threshold. In this manner, a structure that allows the assist control to be stopped in response to rotation of the crankshaft 41 is easily implemented. When the driver rotates the crankshaft 41 backward, the rotational speed of the crankshaft 41 is a negative value. In this case, the rotational speed of the crankshaft 41 is smaller than a threshold, and thus the assist control stopping unit 106 stops assist control.

According to the present preferred embodiment, the battery-assisted bicycle 1 further includes a motor rotation detector 68 that detects a rotation speed of the electric motor 61. The assist control stopping unit 106 includes the assist stop determination unit 113 that stops assist control using a result of comparison between a detection result from the motor rotation detector 68 and a detection result from the crank rotation detector 58. More specifically, according to the present preferred embodiment, the assist control stopping unit 106 further includes the rotation speed comparator 112 that converts a detection result from the motor rotation detector 68 and a detection result from the crank rotation detector 58 into one of a rotation speed of the electric motor 61, a rotation speed of the crankshaft 41, and a reduction ratio of the electric motor 61 for comparison. The assist control stopping unit 106 stops assist control using the comparison result from the rotation speed comparator 112. In this manner, a result obtained from a rotation speed of the electric motor 61 and an actual rotation speed of the crankshaft 41 are compared, so that it is determined that a rider is not pushing on the pedals 33 and 34. Therefore, a structure that accurately stops assist control is implemented.

Second Preferred Embodiment

Figure 7:
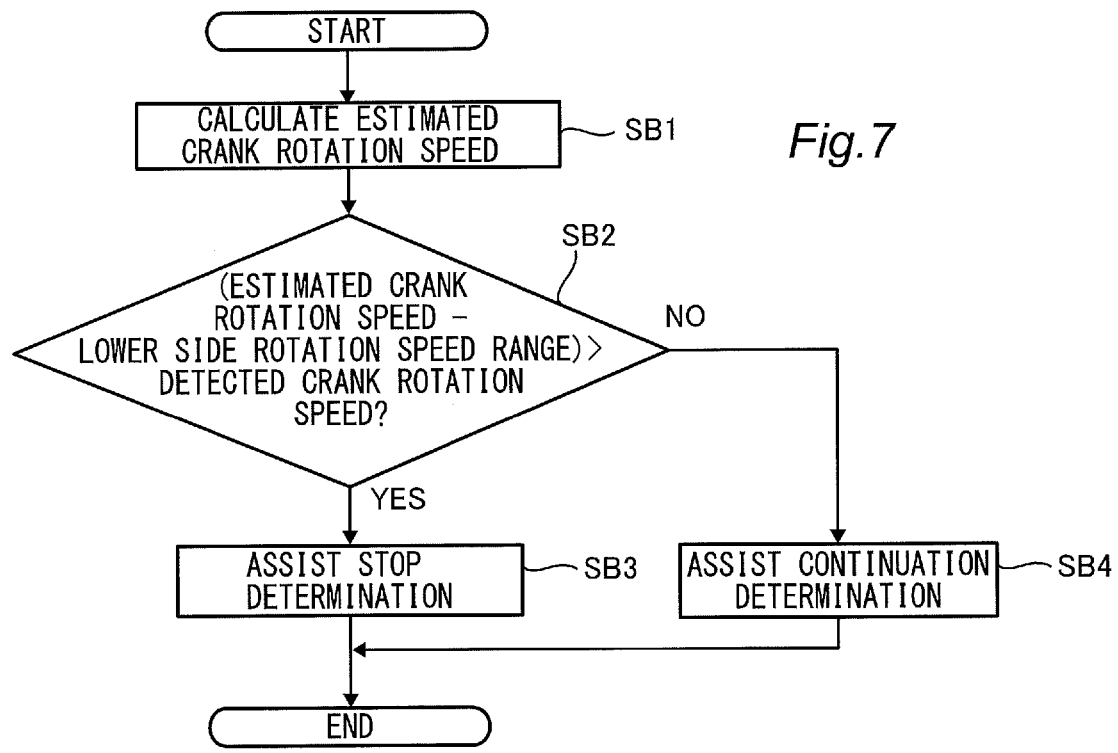
FIG. 7 is a flowchart for illustrating assist stop determination in a battery-assisted bicycle according to a second preferred embodiment of the present invention.

FIG. 7 is a flowchart for illustrating assist stop determination in a battery-assisted bicycle according to a second preferred embodiment of the present invention. The assist stop determination flow according to the second preferred embodiment is preferably different from the assist stop determination flow according to the first preferred embodiment in that a rotation speed of the crankshaft 41 obtained from a determination result from the crank rotation detector 58 is compared to a rotation speed based on an estimated rotation speed that takes errors into account. In the following description, the elements the same as those according to the first preferred embodiment are designated by the same reference characters and their description will not be repeated while only elements different from the first preferred embodiment will be described.

Steps SB1, SB3, and SB4 in the flow in FIG. 7 are preferably the same as steps SA1, SA3, and SA4 in the flow shown in FIG. 6 according to the first preferred embodiment. Therefore, a detailed description of steps SB1, SA3, and SA4 will not be provided.

In the flow shown in FIG. 7, an estimated crank rotation speed is obtained in step SB1, and then it is determined in step SB2 whether a detected crank rotation speed is smaller than a value (threshold) produced by subtracting a lower side rotation speed range (a fluctuation range on the decreasing side of the rotation speed) from the estimated crank rotation speed. More specifically, in step SB2, a rotation speed based on the estimated crank rotation speed that takes into account errors in the rotation speeds of the electric motor 61 and the crankshaft 41 (such as a detection error and a rotation speed change) and the detected crank rotation speed are compared. More specifically, it is determined in step SB2 whether the detected crank rotation speed is less than the estimated crank rotation speed that takes errors into account.

If it is determined in step SB2 that the detected crank rotation speed is less than the value produced by subtracting the lower side rotation speed range from the estimated crank rotation speed (YES), the control proceeds to step SB3 and determines to stop the assist control (assist stop determination). More specifically, if the result of determination in step SB2 is YES, the detected crank rotation speed is less than the rotation speed based on the estimated crank rotation speed that takes errors into account, and therefore it is determined that assistance is not necessary, so that stopping of the assist control is determined.

On the other hand, if it is determined in step SB2 that the detected crank rotation speed is not less than the value produced by subtracting the lower side rotation speed range from the estimated crank rotation speed (NO), the control proceeds to step SB4 and determines to continue the assist control (assist continuation determination).

The flow ends after the determination in steps SB3 and SB4 (END).

In this manner, it is determined whether the detected crank rotation speed is less than the rotation speed based on the estimated crank rotation speed that takes errors into account, so that erroneous determination caused by errors or the like in the rotation speeds of the electric motor 61 and the crankshaft 41 is eliminated or reduced. More specifically, if the rotation speeds of the electric motor 61 and the crankshaft 41 fluctuate, assist stop determination is carried out accurately.

According to the present preferred embodiment, the battery-assisted bicycle 1 further includes the motor rotation detector 68 that detects a rotation speed of the electric motor 61. The assist control stopping unit 106 includes the crank rotation estimation unit 111 that estimates a rotation speed of the crankshaft 41 based on the rotation speed of the electric motor 61 detected by the motor rotation detector 68, the rotation speed comparator 112 that compares the rotation speed of the crankshaft 41 detected by the crank rotation detector 58 to the threshold set to a value smaller than the rotation speed of the crankshaft 41 estimated by the crank rotation estimation unit 111, and the assist stop determination unit 113 that stops assist control if the rotation speed of the crankshaft 41 detected by the crank rotation detector 58 is determined to be smaller than the threshold by the rotation speed comparator 112.

In this manner, if assist control is not necessary in the battery-assisted bicycle 1, the assist control is stopped accurately. More specifically, comparing the detected crank rotation speed to a value lower than the estimated crank rotation speed allows assist control to be stopped quickly and appropriately if detection data at the motor rotation detector 68 and the crank rotation detector 58 has an error or the like.

Third Preferred Embodiment

Figure 8:
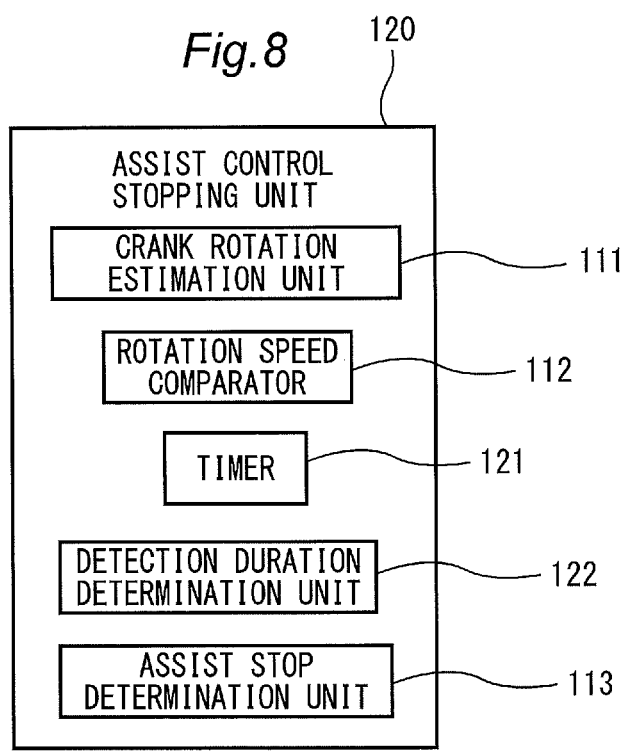
FIG. 8 is a block diagram of a general structure of an assist control stopping unit in a battery-assisted bicycle according to a third preferred embodiment of the present invention.

FIG. 8 shows a general structure of an assist control stopping unit 120 in a battery-assisted bicycle according to a third preferred embodiment of the present invention. The structure according to the third preferred embodiment is preferably different from the structure according to the first preferred embodiment in that the assist control stopping unit 120 includes a timer 121 that counts a duration in which a detected crank rotation speed is determined to be less than an estimated crank rotation speed, and a detection duration determination unit 122 that determines whether the duration counted by the timer 121 is more than a prescribed time period. In the following description, the same elements as those according to the first preferred embodiment are designated by the same reference characters and their description will not be provided while only elements different from the first preferred embodiment will be described.

As shown in FIG. 8, the assist control stopping unit 120 includes the timer 121 (duration measuring unit) and the detection duration determination unit 122. The assist control stopping unit 120 preferably has the same structure as the assist control stopping unit 106 according to the first preferred embodiment except for the timer 121 and the detection duration determination unit 122.

The timer 121 counts a duration in which it is determined by the rotation speed comparator 112 that a detected crank rotation speed is less than an estimated crank rotation speed (hereinafter also referred to as "detection duration"). More specifically, the timer 121 counts about how long a state determined as an assist stopped state according to the first preferred embodiment continues.

The timer 121 resets the count of the duration if it is determined that the detected crank rotation speed is not less than the estimated crank rotation speed.

The detection duration determination unit 122 determines whether the detection duration counted by the timer 121 is not less than a prescribed time period. Note that the prescribed period is set to the minimum duration based on which it can be determined that a rider is not pushing on the pedals. Alternatively, the prescribed time period may change depending on the direction of rotation of the crankshaft 41. For example, the prescribed time period for backward rotation of the crankshaft 41 may be smaller than the prescribed time period for forward rotation of the crankshaft 41. Still alternatively, the prescribed time period for backward rotation of the crankshaft 41 may be zero.

Figure 9:
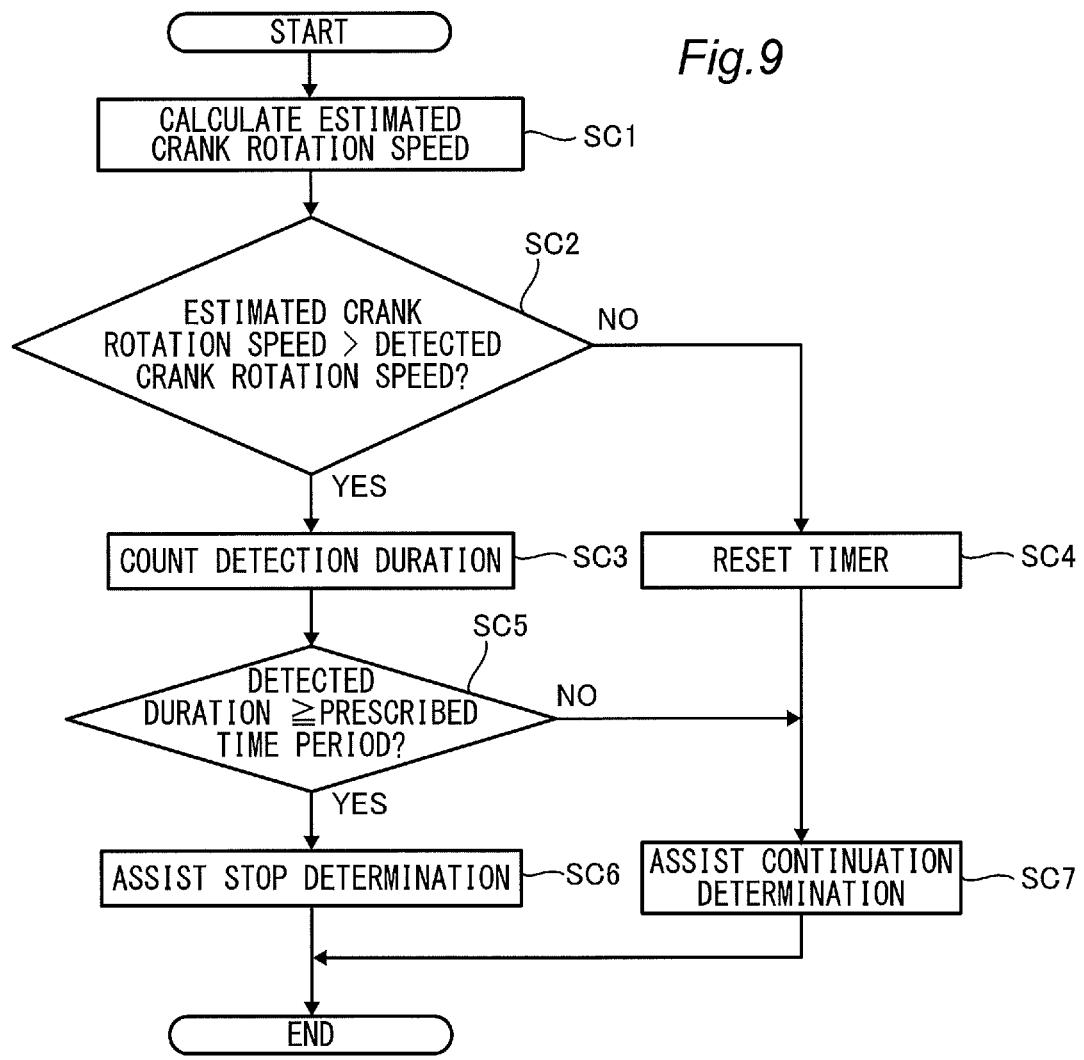
FIG. 9 is a flowchart for illustrating assist stop determination in the battery-assisted bicycle according to the third preferred embodiment of the present invention.

FIG. 9 is a flowchart for illustrating assist stop determination in the structure according to the present preferred embodiment. In FIG. 9, steps SC1, SC2, SC6, and SC7 are preferably the same as steps SA1, SA2, SA3, and SA4 in the flow in FIG. 6 according to the first preferred embodiment. Therefore, a detailed description of steps SC1, SC2, SC6, and SC7 will not be provided.

In the flow in FIG. 9, after an estimated crank rotation speed is obtained in step SC1, it is determined in the succeeding step SC2 whether a detected crank rotation speed is less than the estimated crank rotation speed.

If it is determined in step SC2 that the detected crank rotation speed is less than the detected rotation speed (YES), the control proceeds to the following step SC3 and the duration of the determination (detection duration) is counted by the timer 121.

On the other hand, if it is determined in step SC2 that the detected crank rotation speed is not less than the estimated crank rotation speed (NO), the control proceeds to step SC4 and resets the count of the timer 121. Then, the control proceeds to step SC7 and a determination to continue the assist control (assist continuation determination) is carried out. Then, the flow ends (END).

After the detection duration is counted in step SC3, it is determined in step SC5 whether the detection duration is equal to or more than the prescribed time period. If it is determined in step SC5 that the detection duration is equal to or more than the prescribed time period (YES), the control proceeds to step SC6 and assist stop determination is carried out. On the other hand, if it is determined that the detection duration is less than the prescribed time period (NO), the control proceeds to step SC7 and assist continuation determination is carried out.

After the determination in steps SC6 and SC7, the flow ends (END).

In this manner, if a detected crank rotation speed is less than an estimated rotation speed, it is determined whether the state continues at least for a prescribed time period so that assist control stop determination is carried out accurately. More specifically, according to the present preferred embodiment, if an output value from each of the detectors changes because of a detection error or the like at the detector, variations in assist control stop determination are eliminated or reduced. Therefore, more accurate assist stop determination than the first preferred embodiment is carried out.

According to the present preferred embodiment, the assist control stopping unit 120 further includes the timer 121 that counts a duration in which a detection result from the crank rotation detector 58 converted into one of a rotation speed of the electric motor 61, a rotation speed of the crankshaft 41, and a reduction ratio of the electric motor 61 is determined as being less than a similarly converted detection result from the motor rotation detector 68. The assist stop determination unit 113 stops the assist control if the duration measured by the timer 121 is not less than the prescribed time period.

In this manner, if output values from the detectors temporarily fluctuate, assist stop determination is not made unless the determination as described above that a detected crank rotation speed is less than an estimated crank rotation speed continues at least for the prescribed time period. Therefore, assist stop determination is carried out accurately. Alternatively, the prescribed time period may change depending on the direction of rotation of the crankshaft 41. For example, the prescribed time period for backward rotation of the crankshaft 41 may be smaller than the prescribed time period for forward rotation of the crankshaft 41. Still alternatively, the prescribed time period for backward rotation of the crankshaft 41 may be zero. In this case, assist stop determination for backward rotation of the crankshaft 41 may be made in a short period of time.

Fourth Preferred Embodiment

Figure 10:
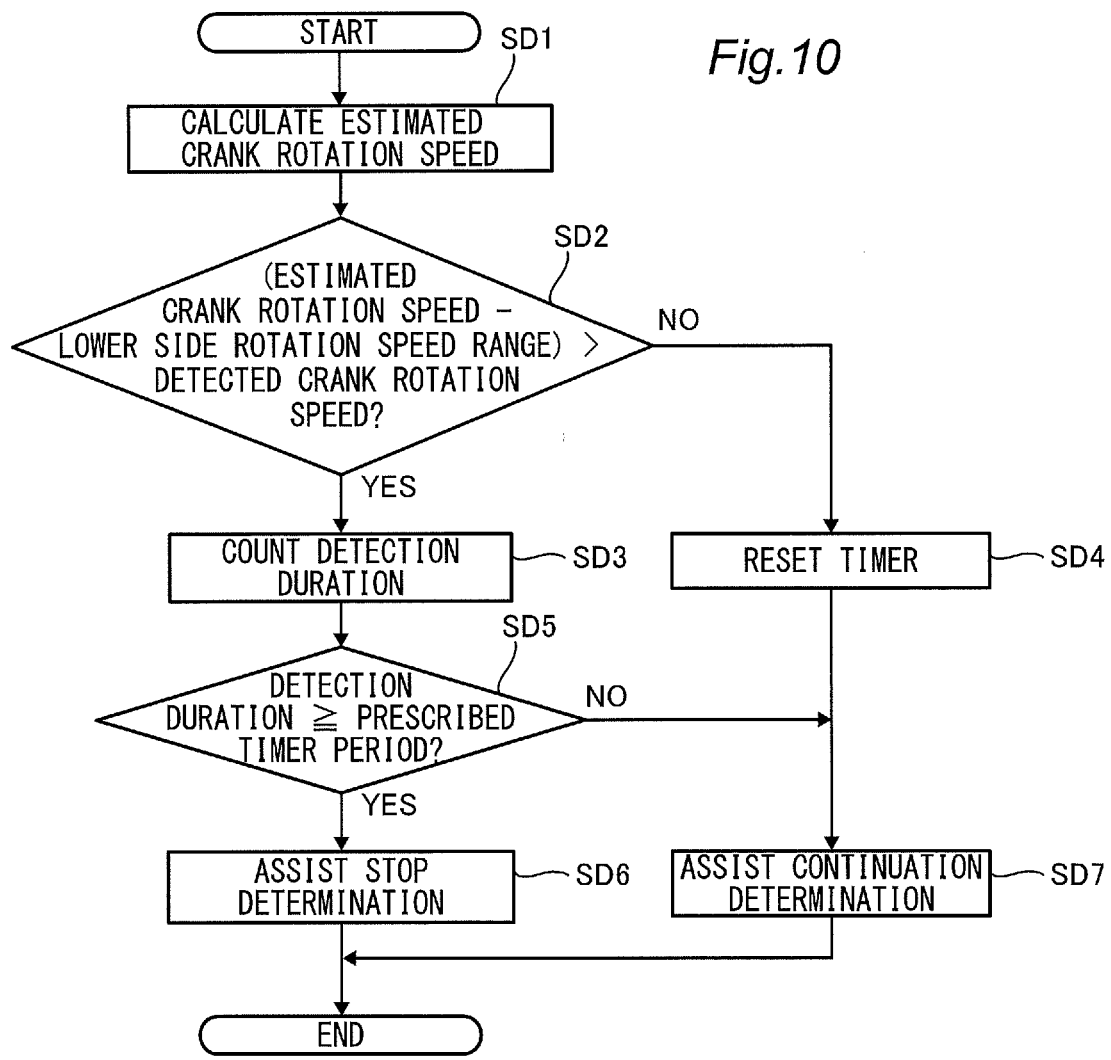
FIG. 10 is a flowchart for illustrating assist stop determination in a battery-assisted bicycle according to a fourth preferred embodiment of the present invention.

FIG. 10 is a flowchart for illustrating assist stop determination in a battery-assisted bicycle according to a fourth preferred embodiment of the present invention. The assist stop determination flow according to the fourth preferred embodiment is preferably different from the assist stop determination flow according to the second preferred embodiment in that the duration of a state determined as an assist stopped state (detection duration) is counted by the timer 121 according to the third preferred embodiment and then assist stop determination is carried out in response to the count result. In the following description, the same elements as those according to the second preferred embodiment are designated by the same reference characters and their description will not be provided while only different elements from the second preferred embodiment will be described.

Steps SD1, SD2, SD6, and SD7 in the flow in FIG. 10 are preferably the same as steps SB1, SB2, SB3, and SB4 in the flow in FIG. 7 according to the second preferred embodiment. Therefore, a detailed description of steps SD1, SD2, SD6, and SD7 will not be provided.

In the flow shown in FIG. 10, it is determined whether a detected crank rotation speed is less than a value produced by subtracting a lower side rotation speed range from the estimated crank rotation speed obtained in step SD1 (step SD2). If it is determined in step SD2 that the detected crank rotation speed is less than the value produced by subtracting the lower side rotation speed range from the estimated crank rotation speed (YES), the control proceeds to step SD3 and the duration of the determination (determination duration) is counted by the timer 121.

On the other hand, if it is determined in step SD2 that the detected crank rotation speed is not less than the value produced by subtracting the lower side rotation speed range from the estimated crank rotation speed (NO), the control proceeds to step SD4. In step SD4, the count of the timer 121 is reset. Then, the control proceeds to step SD7 to carry out assist continuation determination, and then the flow ends (END).

After the detection duration is counted in step SD3, it is determined in the succeeding step SD5 whether the detection duration is equal to or more than a prescribed time period. The prescribed time period is preferably the same as that according to the third preferred embodiment. If it is determined in step SD5 that the detection duration is determined as being equal to or more than the prescribed time (YES), the control proceeds to step SD6 to carry out assist stop determination, and the flow ends (END).

In this manner, a detected crank rotation speed obtained from a detection result from the crank rotation speed 58 is compared to a rotation speed based on an estimated crank rotation speed that takes errors or the like into account, so that the accuracy of the assist stop determination is improved similarly to the second preferred embodiment.

In addition, similarly to the third preferred embodiment, if it is determined that the assist stop condition for the battery-assisted bicycle 1 in the crank rotation speed is satisfied, assist stop determination is not carried out unless the detection duration is equal to or more than the prescribed time period. Therefore, if an output value from each of the detectors fluctuates because of a detection error or the like at the detector, variations in the assist stop determination are eliminated or reduced.

Therefore, according to the present preferred embodiment, the assist stop determination is carried out accurately.

Fifth Preferred Embodiment

Figure 11:
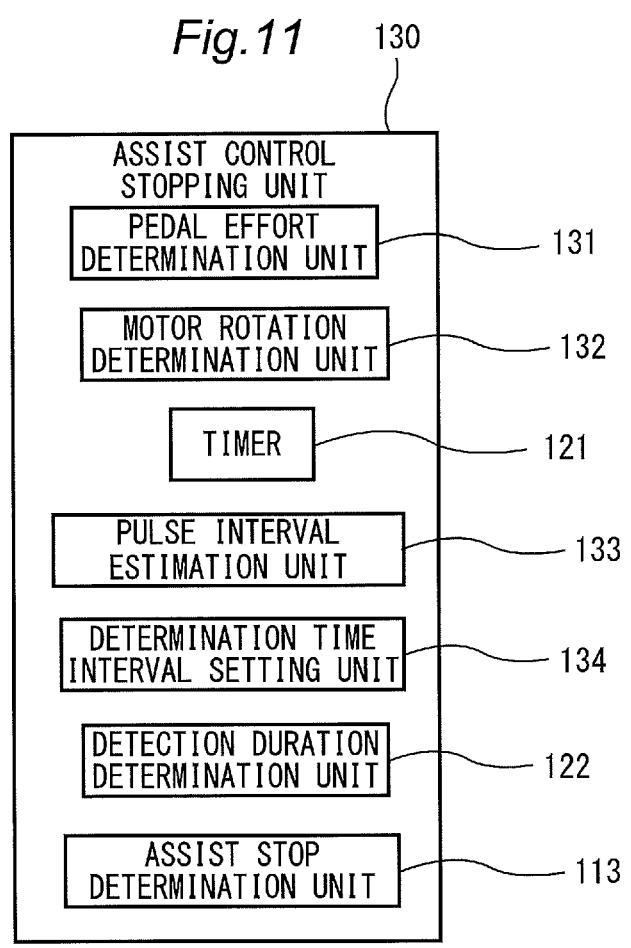
FIG. 11 is a block diagram of a general structure of an assist control stopping unit in a battery-assisted bicycle according to a fifth preferred embodiment of the present invention.

FIG. 11 shows a general structure of an assist control stopping unit 130 in a battery-assisted bicycle according to a fifth preferred embodiment of the present invention. The structure according to the fifth preferred embodiment is preferably different from the structure according to the third preferred embodiment in that it includes a pedaling effort determination unit 131, a motor rotation determination unit 132, a pulse interval estimation unit 133, and a determination time interval setting unit 134 instead of the crank estimation unit 111 and the rotation speed comparator 112. In the following description, the same elements as those according to the third preferred embodiment are designated by the same reference characters and their description will not be provided while only elements different from the third preferred embodiment will be described.

As shown in FIG. 11, the assist control stopping unit 130 includes the pedaling effort determination unit 131, the motor rotation determination unit 132, the timer 121, the pulse interval estimation unit 133, the determination time interval setting unit 134, the detection duration determination unit 122, and the assist stop determination unit 113.

The pedaling effort determination unit (torque determination unit) 131 determines whether pedaling effort (torque) obtained at the pedaling effort detector 101 is less than a pedaling effort threshold (torque threshold). The pedaling effort threshold is set to a pedaling effort value based on which it can be determined that a rider applies a pedaling effort to the crankshaft 41 by pushing on the pedals 33 and 34 depending on the detection accuracy of the torque detector 57.

The motor rotation determination unit 132 determines whether a rotation speed of the electric motor 61 obtained by the motor rotation speed detector 103 is equal to or more than a rotation speed threshold. The rotation speed threshold is a threshold based on which method of determining assist stop is changed in response to a rotation speed of the electric motor 61. If the rotation speed of the electric motor 61 is equal to or more than the rotation speed threshold, no significant error is generated if a rotation speed of the crankshaft 41 is estimated from the rotation speed of the electric motor 61 as will be described. Therefore, as will be described in detail, using a pulse signal interval obtained as the crankshaft 41 rotates, assist stop determination is carried out. On the other hand, if the rotation speed of the electric motor 61 is less than the rotation speed threshold, a significant error results if a rotation speed of the crankshaft 41 is estimated from the rotation speed of the electric motor 61. Therefore, in this case, assist stop determination is carried out based on whether the motor rotation speed is small at least for a prescribed time period as in other preferred embodiments. More specifically, the rotation speed threshold is set to the minimum rotation speed which allows little error to be generated when a rotation speed of the crankshaft 41 is estimated from a motor rotation speed. An error may be generated in the rotation speed, for example, for the following reason. When an encoder that allows the motor rotation speed detector 103 to detect a rotation angle is used and the electric motor 61 rotates at a low speed, the pulse period is prolonged and the detection responsiveness is lowered.

Note that the motor rotation determination unit 132 determines that the electric motor 61 rotates not only when the electric motor 61 is driven but also when the electric motor 61 rotates as the chain rotates 46.

The timer 121 counts a duration in which the same determination continues at the motor rotation determination unit 132. More specifically, if the rotation speed of the electric motor 61 is determined to be equal to or more than the rotation speed threshold, the timer 121 counts the duration of the determination (detection duration A). If the rotation speed of the electric motor 61 is determined to be less than the rotation speed threshold, the timer 121 counts the duration of the determination (detection duration B).

The pulse interval estimation unit 133 estimates an interval of a pulse signal output from the crank rotation detector 58 based on a rotation speed of the electric motor 61 obtained by the motor rotation speed detector 103. The estimated interval of the pulse signal (estimated pulse signal) is used to set a determination time interval that will be described. The pulse signal interval is in inverse proportion with the rotation speed of the crankshaft 41. More specifically, the pulse interval estimation unit 131 estimates the rotation speed of the crankshaft 41 based on the rotation speed of the electric motor 61.

The determination time interval setting unit 134 compares the estimated pulse interval obtained by the pulse interval estimation unit 133 to a fixed value and sets a determination time interval used to determine a detection duration counted by the timer 121. More specifically, the determination time interval setting unit 134 sets the fixed value as a determination time interval if the estimated pulse interval is more than the fixed value and the estimated pulse interval as the determination time interval if the estimated pulse interval is not more than the fixed value.

Note that the determination time interval is preferably a value more than an estimated crank rotation speed obtained based on a motor rotation speed and a reduction ratio within a range equal to or more than the above-described minimum rotation speed. Therefore, an arithmetic expression and a fixed value are previously set according to the above-described minimum rotation speed and the reduction ratio.

The detection duration determination unit 122 determines the detection durations A and B counted by the timer 121. More specifically, the detection duration determination unit 122 determines whether the duration A is more than the determination time interval set by the determination time interval setting unit 134. The detection duration determination unit 122 determines whether the detection duration B is greater than the previously set determination time period. In this manner, the detection duration determination unit 122 determines the durations A and B counted by the timer 121 according to the determination result from the motor rotation determination unit 132. Note that the determination time period is set to a time period based on which it can be determined that a rider is not pushing on the pedals 33 and 34.

The assist stop determination unit 113 carries out determination to stop assist control if it is determined by the detection duration determination unit 122 that the detection duration A is more than the determination time interval or the detection duration B is not less than the determination time period.

Figure 12:
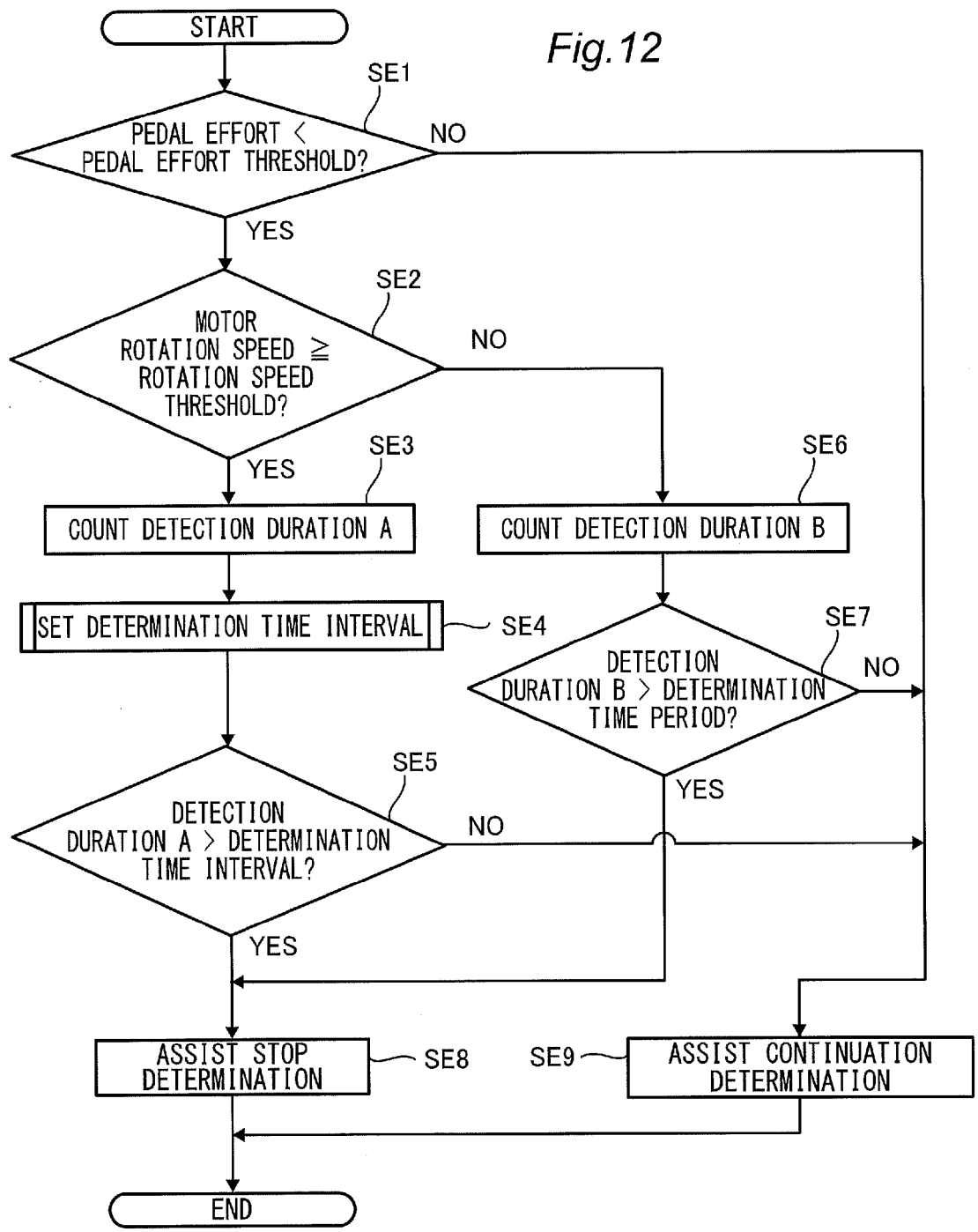
FIG. 12 is a flowchart for illustrating assist stop determination in the battery-assisted bicycle according to the fifth preferred embodiment of the present invention.

FIG. 12 is a flowchart for illustrating an assist stop determination carried out by the assist control stopping unit 130.

When the flow in FIG. 12 starts (START), it is determined in step SE1 by the pedaling effort determination unit 131 whether pedaling effort obtained by the pedaling effort detector 101 is less than the pedaling effort threshold. If it is determined in step SE1 that the pedaling effort is less than the pedaling effort threshold (YES), the control proceeds to step SE2 and it is determined by the motor rotation determination unit 132 whether the rotation speed of the electric motor 61 (motor rotation speed) is equal to or larger than the rotation speed threshold.

On the other hand, if it is determined in step SE1 that the pedaling effort is not less than the pedaling effort threshold (NO), the control proceeds to step SE9, in which it is determined to continue the assist control (assist continuation determination), and then the flow ends (END).

Figure 14:
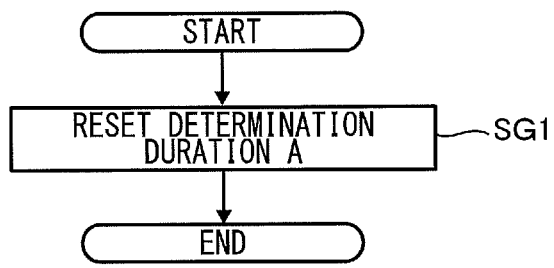
FIG. 14 is a flowchart for illustrating how a detection duration A is reset in the battery-assisted bicycle according to the fifth preferred embodiment of the present invention.

If it is determined in step SE2 that the motor rotation speed is equal to or more than the rotation speed threshold (YES), the control proceeds to step SE3 and the duration of the determination (detection duration A) is counted by the timer 121. Note that if a pulse signal is output from the crank rotation detector 58, the detection duration A is reset. More specifically, when a pulse signal is output from the crank rotation detector 58, the flow shown in FIG. 14 starts, and the detection duration A being counted by the timer 121 is reset (step SG1).

After the detection duration A is counted in step SE3, a determination time interval is set in the succeeding step SE4. The determination time interval is set in step SE4 according to the flow shown in FIG. 13. How to set the determination time interval will be described.

After setting the determination time interval in step SE4, it is determined in step SE5 whether the detection duration A counted in step SE3 is more than the determination time interval set in step SE4. If it is determined that the detection duration A is more than the determination time interval (YES), the control proceeds to step SE8, and assist control stop determination (assist stop determination) is carried out by the assist stop determination unit 113. Then, the flow ends (END).

On the other hand, if it is determined in step SE5 that the detection duration A is not more than the determination time interval (NO), the control proceeds to step SE9, assist continuation determination is carried out, and then the flow ends (END).

Figure 13:
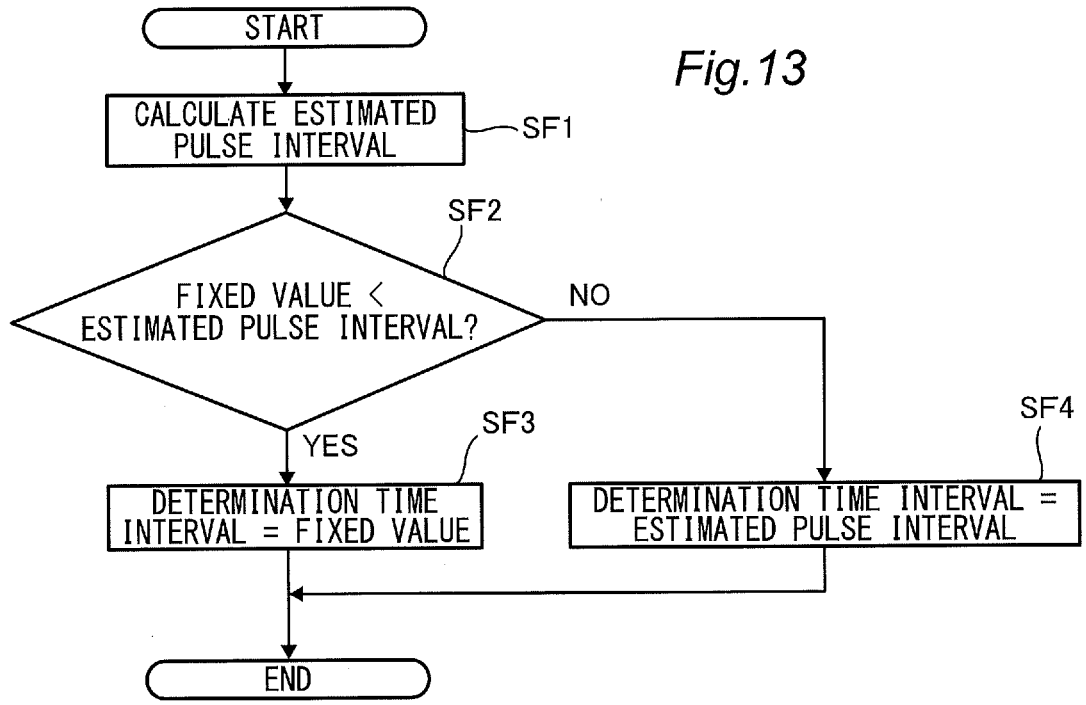
FIG. 13 is a flowchart for illustrating how a determination time interval is set in the battery-assisted bicycle according to the fifth preferred embodiment of the present invention.

In this manner, if it is determined in step SE2 that the motor rotation speed is equal to or more than the rotation speed threshold (YES) and the duration of the state (detection duration A) is more than the determination time interval set according to the flow in FIG. 13, the assist control is stopped.

On the other hand, if it is determined in step SE2 that the motor rotation speed is less than the rotation speed threshold (NO), the control proceeds to step SE6 and the duration of the determination (detection duration B) is counted by the timer 121. Then, in the succeeding step SE7, it is determined whether the detection duration B counted in step SE6 is equal to or more than the pre-determined determination time period.

If it is determined in step SE7 that the detection duration B is equal to or more than the determination time period (YES), the control proceeds to step SE8, assist stop determination is carried out and the flow ends (END). On the other hand, if it is determined in step SE7 that the detection duration B is less than the determination time period (NO), the control proceeds to step SE9, assist continuation determination is carried out, and the flow ends (END).

As described above, if it is determined in step SE2 that the motor rotation speed is less than the rotation speed threshold (NO) and the state continues at least for the determination time period, the assist control is preferably stopped in a similar manner to the assist stop determination of the other preferred embodiments.

More specifically, according to the present preferred embodiment, one of the two assist stop determination methods is used to carry out assist stop determination depending on the motor rotation speed.

Now, how a determination time interval is set in step SE4 described above will be described with reference to FIG. 13.

When the flow in FIG. 13 starts (START), an estimated pulse interval is obtained in step SF1 by the pulse interval estimation unit 133 based on a motor rotation speed obtained by the motor rotation speed detector 103. The estimated pulse interval is an interval of a pulse signal estimated to be output from the crank rotation detector 58 and calculated based on the rotation speed of the electric motor 61 output from the motor rotation speed detector 103.

It is determined in the succeeding step SF2 whether the estimated pulse interval obtained in step SF1 is more than a fixed value (prescribed interval). If it is determined in step SF2 that the estimated pulse interval is more than the fixed value (YES), the control proceeds to step SF3, and the fixed value is set as a determination time interval. Then, the flow ends (END).

If it is determined in step SF2 that the estimated pulse interval is not more than the fixed value (NO), the control proceeds to step SF4, and the estimated pulse interval is set as a determination time interval. Then, the flow ends (END).

Figure 15:
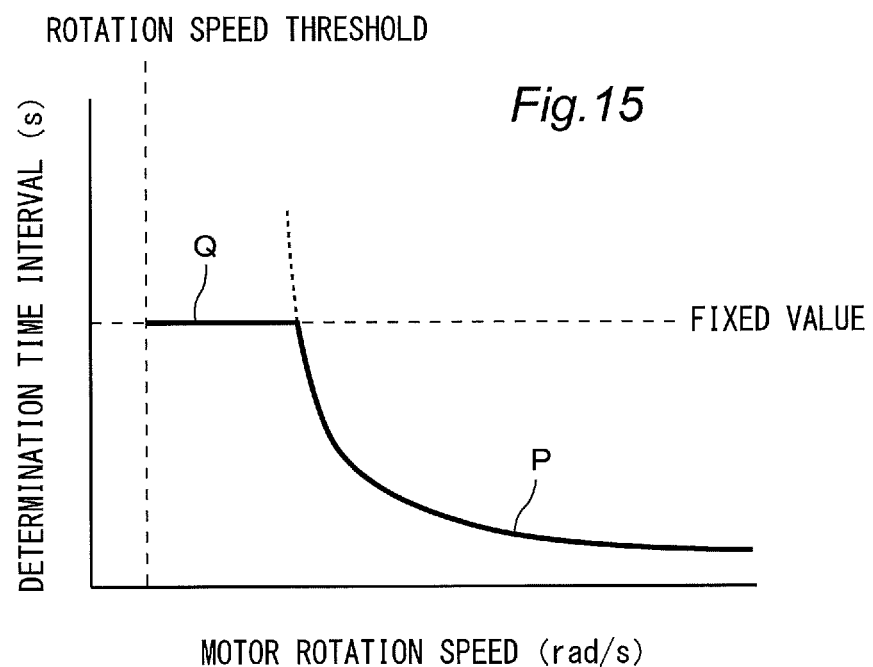
FIG. 15 is a view showing a relationship between a determination time interval set according to the flowchart for setting the determination time interval and a motor rotation speed in the battery-assisted bicycle according to the fifth preferred embodiment of the present invention.

In this manner, the determination time interval used as a determination reference for the detection duration A in the flow in FIG. 12 is determined according to the estimated pulse interval calculated based on the motor rotation speed. FIG. 15 schematically shows a relationship between the motor rotation speed and the determination time interval set according to the above-described flow. As described above, the determination time interval is set if the motor rotation speed is equal to or more than the rotation speed threshold, and therefore the curve (bold line) of the determination time interval is only in the range in which the motor rotation speed is equal to or more than the rotation speed threshold as shown in FIG. 15.

In FIG. 15, the curve segment P represents a relationship between the estimated pulse interval obtained based on the motor rotation speed output from the motor rotation speed detector 103 and the motor rotation speed. The straight line segment Q represents the fixed value. As can be seen from FIG. 15, in the range of the estimated pulse interval being more than the fixed value (the left part of the graph), the fixed value Q is determined as the determination time interval, while in the range of the estimated pulse interval being less than the fixed value (the right side of the graph), the estimated pulse interval is set as the determination time interval.

Note that in FIG. 15, assist control is stopped in the range above the line representing the relationship between the motor rotation speed and the determination time interval (where the time interval is larger).

In this manner, in the range in which the motor rotation speed is lower, the determination time interval is set to a fixed value, so that assist control is stopped quickly in the range in which the motor rotation speed is low.

As in the foregoing description, assist stop determination is carried out in a simple manner using an interval of a pulse signal output from the crank rotation detector 58 as compared to the case of obtaining a rotation speed of the crankshaft 41. More specifically, a pulse interval is compared directly to a detection duration counted by the timer 121, so that it is not necessary to obtain a rotation speed of the crankshaft 41 as in other preferred embodiments. Therefore, assist stop determination is carried out by a simpler algorithm.

According to the present preferred embodiment, the crank rotation detector 58 outputs a pulse signal in response to rotation of the crankshaft 41. The assist control stopping unit 130 stops the assist control based on the pulse signal output from the crank rotation detector 58. This eliminates the necessity of obtaining a rotation speed of the crankshaft 41 so that the calculation load on the controller is reduced.

According to the present preferred embodiment, the battery-assisted bicycle 1 further includes a torque detector 57 that detects a torque generated at the crankshaft 41 and a motor rotation detector 68 that detects a rotation speed of the electric motor 61. The assist control stopping unit 130 includes the determination time interval setting unit 134 that sets a determination time interval in response to the rotation speed of the electric motor 61, the pedaling effort determination unit 131 that determines whether the torque detected by the torque detector 57 is equal to or less than a torque threshold, the motor rotation determination unit 132 that determines whether the rotation speed of the electric motor 61 detected by the motor rotation detector 58 is equal to or more than a rotation speed threshold, the timer 121 that counts a duration in which the torque is determined to be equal to or less than the torque threshold by the torque detector 57 and the rotation speed is determined to be equal to or more than the rotation speed threshold by the motor rotation determination unit 132 and resets the count of the duration to zero when the pulse signal is output from the crank rotation detector 58, and the assist stop determination unit 113 that stops assist control if the duration measured by the timer 121 is more than the determination time interval set by the determination time interval setting unit 134.

In this manner, the structure that allows assist control to be carried out with the pulse signal output from the crank rotation detector 58 is implemented.

According to the present preferred embodiment, the assist control stopping unit 130 further includes the pulse interval estimation unit 133 that estimates an interval of a pulse signal based on the rotation speed of the electric motor 61 detected by the motor rotation speed detector 68. The determination time interval setting unit 134 sets the determination time interval to a prescribed interval in a range in which the pulse signal interval estimated by the pulse interval estimation unit 133 is more than the prescribed interval and to the pulse signal interval in a range in which the estimated pulse signal interval is equal to or less than the prescribed interval. In this manner, in the range in which the estimated pulse interval is more than the prescribed interval, in other words in the range in which the rotation speed of the crankshaft 41 is low, the determination time interval is shorter than the estimated pulse interval. Therefore, the assist control is stopped quickly.

Sixth Preferred Embodiment

Figure 16:
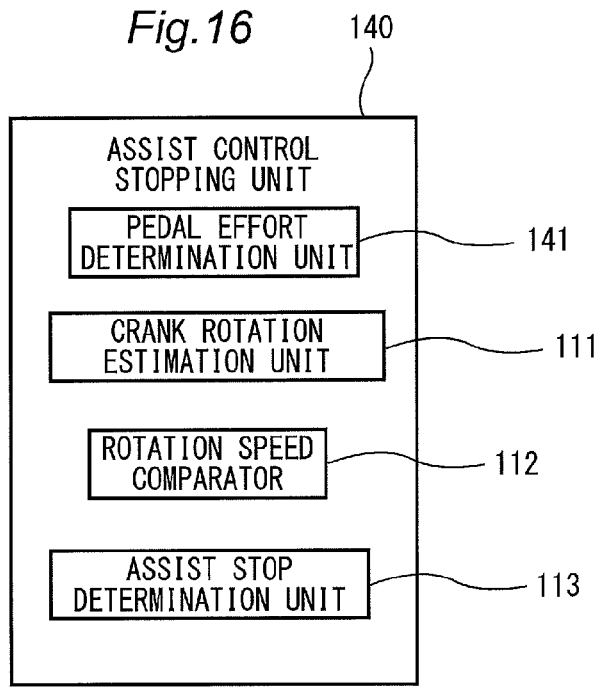
FIG. 16 is a block diagram of a general structure of an assist control stopping unit in a battery-assisted bicycle according to a sixth preferred embodiment of the present invention.

FIG. 16 shows a general structure of an assist control stopping unit 140 for use in a battery-assisted bicycle according to a sixth preferred embodiment of the present invention. The structure according to the sixth preferred embodiment is preferably different from the structure according to the first preferred embodiment in that it has the same pedaling effort determination unit 141 as that according to the fifth preferred embodiment. In the following description, the same elements as those according to the first preferred embodiment are designated by the same reference characters and their description will not be provided while only different elements from the first preferred embodiment will be described.

The pedaling effort determination unit 141 determines whether pedaling effort obtained by a pedaling effort detector 101 is less than a pedaling effort threshold. Similarly to the fifth preferred embodiment, the pedaling effort threshold is set to a pedaling effort value based on which it can be determined that a rider is pushing on the pedals 33 and 34 and thus applies a pedaling effort to the crankshaft 41 depending on the detection accuracy of the torque detector 57.

Figure 17:
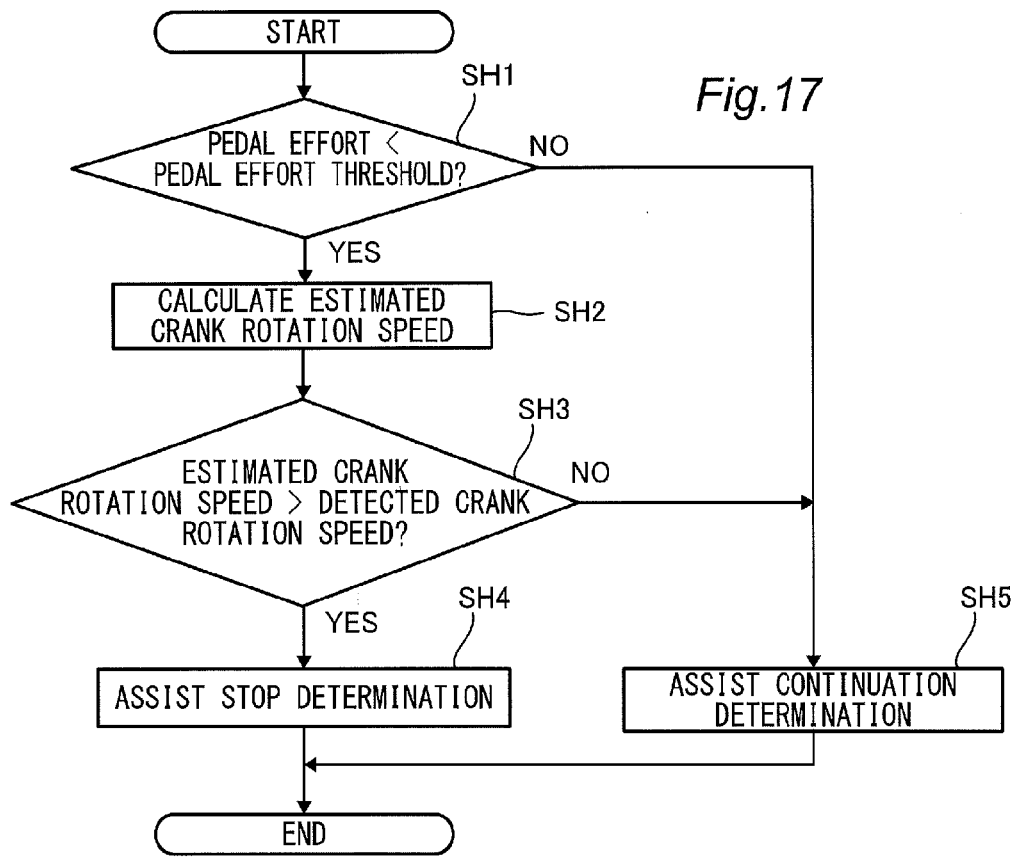
FIG. 17 is a flowchart for illustrating assist stop determination in the battery-assisted bicycle according to the sixth preferred embodiment of the present invention.

FIG. 17 is a flowchart for illustrating an assist stop determination by the assist control stopping unit 140 according to the present preferred embodiment. The flow in FIG. 17 is preferably different from the flow shown in FIG. 6 according to the first preferred embodiment in that it is determined whether the pedaling effort is more than the pedaling effort threshold before a detected crank rotation speed is compared to an estimated crank rotation speed.

Therefore, steps SH2 to SH5 in the flow shown in FIG. 17 are preferably the same as steps SA1 to SA4, respectively, in the flow shown in FIG. 6 according to the first preferred embodiment. Therefore, a detailed description of steps SH2 to SH5 will not be provided.

When the flow in FIG. 17 starts (START), it is determined in step SH1 by the pedaling effort determination unit 141 whether pedaling effort (torque) obtained by the pedaling effort detector 101 is less than the pedaling effort threshold (prescribed value). If it is determined in step SH1 that the pedaling effort is less than the pedaling effort threshold (YES), the control proceeds to step SH2 and on, and if a detected crank rotation speed is less than an estimated crank rotation speed (threshold), a determination to stop the assist control is carried out (steps SH3 and SH4). Note that if the detected crank rotation speed is equal to or more than the estimated crank rotation speed, an assist continuation determination is carried out (steps SH3 and SH5).

On the other hand if is determined in step SH1 that the pedaling effort is not less than the pedaling effort (NO), the control proceeds to step SH5, and an assist continuation determination is carried out. Then, the flow ends (END).

As in the foregoing description, not only the crank rotation speed but also the pedaling effort, i.e., the torque generated at the crankshaft 41 is determined, so that assist control can be carried out when a rider is pushing on the pedals 33 and 34 at a low crank rotation speed. In this manner, when the battery-assisted bicycle 1 is started from a stationary state, smooth assist control is carried out.

Note that according to the present preferred embodiment, the assist control stopping unit 140 is arranged to determine the pedaling effort in the flow shown in FIG. 6 according to the first preferred embodiment, but it may be arranged to determine the pedaling effort in the same manner in the flows according to the second to fourth preferred embodiments.

According to the present preferred embodiment, the torque detector 57 that detects a torque generated at the crankshaft 41 is further provided. The assist control stopping unit 140 stops assist control if the torque detected by the torque detector 57 is less than a prescribed value and a rotation speed of the crankshaft 41 detected by the crank rotation detector 58 is less than a threshold. In this manner, when the battery-assisted bicycle 1 starts from a stationary state, assist control is carried out smoothly without stopping the assist control before the crankshaft 41 attains a rotation state.

Other Preferred Embodiments

Although preferred embodiments of the present invention have been described and illustrated, it is clearly understood that the same is by way of illustration and example only. The present invention is not limited to the above-described preferred embodiments and the preferred embodiments can be modified in various forms without departing from the scope and spirit of the present invention.

According to the fifth preferred embodiment, the assist control stopping unit 130 preferably determines whether the pedaling effort is less than a pedaling effort threshold and then determines whether a motor rotation speed is equal to or less than a rotation speed threshold. However, the order of determining the pedaling effort and the motor rotation speed can be reversed. Similarly, according to the sixth preferred embodiment, the assist control stopping unit 140 preferably determines the pedaling effort and then the detected crank rotation speed, but the order of determining the pedaling effort and the crank rotation speed may be reversed.

According to the fifth preferred embodiment, the determination time interval setting unit 134 preferably sets a fixed value as a determination time interval if an estimated pulse interval is more than the fixed value. However, the determination time interval setting unit may be arranged to set an estimated pulse interval as a determination time interval.

According to the fifth preferred embodiment, the assist control stopping unit 130 preferably counts a detection duration A if a motor rotation speed is equal to or more than a rotation speed threshold and a detection duration B if the motor rotation speed is less than the rotation speed threshold. However, the assist control stopping unit may be arranged to count the detection duration A regardless of the motor rotation speed. In this case, steps SE2, SE6, and SE7 in FIG. 12 are not necessary.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A driving unit that assists a rider's pedaling effort by a providing driving force from an electric motor, the driving unit comprising:
    a crankshaft to which pedals are to be connected;
    a crank rotation detector that detects rotation of the crankshaft and outputs a pulse signal in response to the rotation of the crankshaft;
    a torque detector that detects a torque generated at the crankshaft;
    a motor rotation detector that detects a rotation speed of the electric motor; and an assist control stopping unit programmed to stop an assist control in response to a rotation of the crankshaft detected by the crank rotation detector, wherein the assist control stopping unit is further programmed to stop the assist control based on a result of a comparison between a determination time interval which is set in response to the rotation speed of the electric motor and a measured duration in which the torque is determined as being not more than a torque threshold and the rotation speed of the electric motor is determined as being equal to or more than a rotation speed threshold, the measured duration being measured based on the pulse signal.

2. The driving unit according to claim 1, wherein the crank rotation detector is arranged to detect a rotation speed of the crankshaft; and
the assist control stopping unit is programmed to stop the assist control based on the rotation speed of the crankshaft detected by the crank rotation detector.

3. The driving unit according to claim 2, wherein the assist control stopping unit is programmed to stop the assist control if the rotation speed of the crankshaft is less than a predetermined threshold.

4. The driving unit according to claim 3, wherein the assist control stopping unit includes an assist stop determination unit programmed to stop the assist control using a result of a comparison between a detection result from the motor rotation detector and a detection result from the crank rotation detector.

5. The driving unit according to claim 4, wherein the assist control stopping unit further includes a rotation speed comparator that converts the detection result from the motor rotation detector and the detection result from the crank rotation detector into one of a rotation speed of the electric motor, a rotation speed of the crankshaft, and a reduction ratio of the electric motor for comparison; and
the assist control stopping unit is programmed to stop the assist control using a comparison result from the rotation speed comparator.

6. The driving unit according to claim 5, wherein the assist control stopping unit further includes a duration measuring unit that measures a duration in which the detection result from the crank rotation detector converted into one of the rotation speed of the electric motor, the rotation speed of the crankshaft, and the reduction ratio of the electric motor is less than the detection result from the motor rotation detector converted in a same manner; and
the assist stop determination unit is programmed to stop the assist control if the duration measured by the duration measuring unit is equal to or more than a prescribed time period.

7. The driving unit according to claim 6, wherein the prescribed time period changes depending on a direction of rotation of the crankshaft.

8. The driving unit according to claim 7, wherein the prescribed time period for backward rotation of the crankshaft is smaller than the prescribed time period for forward rotation of the crankshaft.

9. The driving unit according to claim 8, wherein the prescribed time period for backward rotation of the crankshaft is zero.

10. The driving unit according to claim 3, wherein the assist control stopping unit is programmed to stop the assist control if the torque detected by the torque detector is less than a prescribed value and the rotation speed of the crankshaft detected by the crank rotation detector is less than the predetermined threshold.

11. The driving unit according to claim 1, wherein the assist control stopping unit is programmed to stop the assist control based on the pulse signal output from the crank rotation detector.

12. The driving unit according to claim 11, wherein the assist control stopping unit includes:
a determination time interval setting unit that sets the determination time interval in response to the rotation speed of the electric motor;
a torque determination unit that determines whether the torque detected by the torque detector is equal to or less than the torque threshold;
a motor rotation determination unit that determines whether the rotation speed of the electric motor detected by the motor rotation detector is equal to or more than the rotation speed threshold;
a duration measuring unit that measures the measured duration in which the torque is determined as being not more than the torque threshold and the rotation speed is determined as being equal to or more than the rotation speed threshold and resets the measured duration to zero if the pulse signal is output from the crank rotation detector; and
an assist stop determination unit programmed to stop the assist control if the duration measured by the duration measuring unit is more than the determination time interval set by the determination time interval setting unit.

13. The driving unit according to the claim 12, wherein the assist control stopping unit further includes a pulse interval estimation unit that estimates an interval of the pulse signal based on the rotation speed of the electric motor detected by the motor rotation detector; and
the determination time interval setting unit sets the determination time interval to a prescribed interval in a range where the pulse signal interval estimated by the pulse interval estimation unit is more than the prescribed interval and to the pulse signal interval in a range where the estimated pulse signal interval is equal to or less than the prescribed interval.

14. A battery-assisted bicycle including the driving unit according to claim 1.

* * * * *